US012183566B2

(12) United States Patent
Jarrold et al.

(10) Patent No.: US 12,183,566 B2
(45) Date of Patent: Dec. 31, 2024

(54) TIME-DOMAIN ANALYSIS OF SIGNALS FOR CHARGE DETECTION MASS SPECTROMETRY

(71) Applicant: THE TRUSTEES OF INDIANA UNIVERSITY, Bloomington, IN (US)

(72) Inventors: Martin F. Jarrold, Bloomington, IN (US); Daniel Botamanenko, Bloomington, IN (US)

(73) Assignee: THE TRUSTEES OF INDIANA UNIVERSITY, Bloomington, IN (US)

( * ) Notice: Subject to any disclaimer, the term of this patent is extended or adjusted under 35 U.S.C. 154(b) by 365 days.

(21) Appl. No.: 17/791,979

(22) PCT Filed: Feb. 3, 2021

(86) PCT No.: PCT/US2021/016435

§ 371 (c)(1),
(2) Date: Jul. 11, 2022

(87) PCT Pub. No.: WO2021/158676

PCT Pub. Date: Aug. 12, 2021

(65) Prior Publication Data

US 2023/0046906 A1 Feb. 16, 2023

Related U.S. Application Data

(60) Provisional application No. 62/969,325, filed on Feb. 3, 2020.

(51) Int. Cl.
*H01J 49/42* (2006.01)
*H01J 49/02* (2006.01)

(52) U.S. Cl.
CPC ........ *H01J 49/4245* (2013.01); *H01J 49/025* (2013.01)

(58) Field of Classification Search
CPC .. H01J 49/4245; H01J 49/025; H01J 49/0027; H01J 49/027; H01J 49/422
(Continued)

(56) References Cited

U.S. PATENT DOCUMENTS 3,019,168 A 1/1962 Taylor
5,285,063 A 2/1994 Schwartz et al.
(Continued)

FOREIGN PATENT DOCUMENTS

JP 11144675 5/1999
JP 2008186730 A 8/2008
(Continued)

OTHER PUBLICATIONS

PCT International Search Report and Written Opinion completed by the ISA/US on Jan. 12, 2016 and issued in connection with PCT/US2015/059463.
(Continued)

*Primary Examiner* — Kiet T Nguyen
(74) *Attorney, Agent, or Firm* — Barnes & Thornburg LLP

(57) ABSTRACT

A charge detection mass spectrometer (CDMS) includes an electrostatic linear ion trap (ELIT), a processor, and a memory having instructions stored therein executable by the processor to (a) control the ELIT to trap an ion, (b) collect ion measurement information as the trapped ion oscillates back and forth through the ELIT, the ion measurement information including charge induced by the ion on a charge detector of the ELIT during each pass of the ion through the ELIT and timing of the induced charges relative to one another, (c) process the ion measurement information in the time-domain for each of a plurality of sequential time windows of the ion measurement information to determine a charge magnitude of the ion during each time window, and
(Continued)

(d) determine the magnitude of charge of the trapped ion based on the charge magnitudes of each of the time windows.

20 Claims, 9 Drawing Sheets

(58) Field of Classification Search
USPC .................................................. 250/281, 282
See application file for complete search history.

(56) References Cited

U.S. PATENT DOCUMENTS

| | | | |
|---|---|---|---|
| 5,478,745 | A | 12/1995 | Samulski |
| 5,572,025 | A | 11/1996 | Cotter |
| 5,770,857 | A | 6/1998 | Fuerstenau et al. |
| 5,863,541 | A | 1/1999 | Samulski et al. |
| 5,869,248 | A | 2/1999 | Yuan et al. |
| 5,877,022 | A | 3/1999 | Stinchcomb et al. |
| 5,880,466 | A | 3/1999 | Benner |
| 5,882,652 | A | 3/1999 | Valdes et al. |
| 5,886,346 | A | 3/1999 | Makarov |
| 5,905,040 | A | 5/1999 | Mazzara et al. |
| 5,916,563 | A | 6/1999 | Young et al. |
| 5,965,358 | A | 10/1999 | Carrion et al. |
| 6,013,487 | A | 1/2000 | Mitchell |
| 6,083,702 | A | 7/2000 | Mitchell et al. |
| 6,156,303 | A | 12/2000 | Russell et al. |
| 6,183,950 | B1 | 2/2001 | Madonna |
| 6,583,408 | B2 | 6/2003 | Smith et al. |
| 6,744,042 | B2 | 6/2004 | Zajfman et al. |
| 6,753,523 | B1 | 6/2004 | Whitehouse |
| 6,888,130 | B1 | 5/2005 | Gonin |
| 7,314,912 | B1 | 1/2008 | Hallek et al. |
| 7,829,842 | B2 | 11/2010 | Makarov |
| 8,294,085 | B2 | 10/2012 | Ding |
| 8,395,112 | B1 | 3/2013 | Bier |
| 8,409,870 | B2 | 4/2013 | Van Wuijckhuijse |
| 8,766,170 | B2 | 7/2014 | Guna et al. |
| 9,095,793 | B2 | 8/2015 | Flagan |
| 10,056,244 | B1 | 8/2018 | Quarmby et al. |
| 11,177,122 | B2 * | 11/2021 | Jarrold .................. H01J 49/027 |
| 11,257,665 | B2 | 2/2022 | Jarrold et al. |
| 2002/0185606 | A1 | 12/2002 | Smith et al. |
| 2003/0155502 | A1 | 8/2003 | Grosshans et al. |
| 2004/0169137 | A1 | 9/2004 | Westphall et al. |
| 2005/0236375 | A1 | 10/2005 | Gefter et al. |
| 2007/0102634 | A1 | 5/2007 | Frey et al. |
| 2007/0254352 | A1 | 11/2007 | Schaffer et al. |
| 2009/0020694 | A1 | 1/2009 | Florey |
| 2009/0078866 | A1 | 3/2009 | Li et al. |
| 2009/0108194 | A1 | 4/2009 | Page et al. |
| 2009/0294641 | A1 | 12/2009 | Konicek et al. |
| 2009/0294655 | A1 | 12/2009 | Ding et al. |
| 2010/0084549 | A1 | 4/2010 | Ermakov et al. |
| 2010/0084552 | A1 | 4/2010 | Kawana |
| 2010/0090102 | A1 | 4/2010 | Rather et al. |
| 2010/0227310 | A1 | 9/2010 | Manalis et al. |
| 2010/0234837 | A1 | 9/2010 | Alfano |
| 2010/0314538 | A1 | 12/2010 | Makarov et al. |
| 2010/0320377 | A1 | 12/2010 | Cotter |
| 2011/0095175 | A1 | 4/2011 | Bateman |
| 2011/0240845 | A1 | 10/2011 | Ding |
| 2012/0112056 | A1 | 5/2012 | Brucker et al. |
| 2012/0282641 | A1 | 11/2012 | Reilly et al. |
| 2013/0068942 | A1 | 3/2013 | Verenchikov |
| 2013/0124099 | A1 | 5/2013 | Ecker et al. |
| 2013/0175440 | A1 | 7/2013 | Perelman et al. |
| 2013/0200261 | A1 | 8/2013 | Mizutani et al. |
| 2013/0234017 | A1 | 9/2013 | Kaltashov et al. |
| 2013/0327934 | A1 | 12/2013 | Makarov et al. |
| 2014/0197333 | A1 | 7/2014 | Jolliffe et al. |
| 2014/0299766 | A1 | 10/2014 | Anderson et al. |
| 2014/0346344 | A1 | 11/2014 | Chen |
| 2015/0008316 | A1 | 1/2015 | Guna |
| 2015/0021472 | A1 | 1/2015 | Makarov |
| 2015/0325425 | A1 | 11/2015 | Makarov |
| 2015/0331000 | A1 | 11/2015 | Collier et al. |
| 2016/0005580 | A1 | 1/2016 | Grinfeld |
| 2016/0035556 | A1 | 2/2016 | Berkout et al. |
| 2016/0181084 | A1 | 6/2016 | Smith |
| 2016/0336165 | A1 | 11/2016 | Guna |
| 2017/0040152 | A1 | 2/2017 | Makarov |
| 2017/0307565 | A1 | 10/2017 | Clemmer et al. |
| 2017/0372883 | A1 | 12/2017 | Verenchikov |
| 2020/0243317 | A1 | 7/2020 | Lopez-Hilfiker et al. |
| 2020/0357626 | A1 | 11/2020 | Jarrold et al. |
| 2021/0319994 | A1 | 10/2021 | Jarrell et al. |
| 2022/0344145 | A1 * | 10/2022 | Jarrold .................. H01J 49/027 |

FOREIGN PATENT DOCUMENTS

| | | | |
|---|---|---|---|
| JP | 2011523172 | A | 8/2011 |
| JP | 2014501429 | A | 1/2014 |
| NO | 2017190031 | A1 | 11/2017 |
| WO | 1998011244 | A1 | 3/1998 |
| WO | 1999061601 | A1 | 12/1999 |
| WO | 2000028004 | A1 | 5/2000 |
| WO | 2000028061 | A1 | 5/2000 |
| WO | 2001092551 | A2 | 5/2001 |
| WO | 2003042704 | A1 | 5/2003 |
| WO | 2006130474 | A2 | 12/2006 |
| WO | 2010135830 | A1 | 12/2010 |
| WO | 2012080352 | A1 | 6/2012 |
| WO | 2012083031 | A1 | 6/2012 |
| WO | 2012145037 | A1 | 10/2012 |
| WO | 2016073850 | A1 | 5/2016 |
| WO | 2017162779 | A1 | 9/2017 |
| WO | 2019118242 | A1 | 6/2019 |
| WO | 20190140233 | A1 | 7/2019 |
| WO | 2019162687 | A1 | 8/2019 |
| WO | 20190231854 | A1 | 12/2019 |
| WO | 20190236142 | A1 | 12/2019 |
| WO | 2020/117292 | A1 | 6/2020 |
| WO | 2020/219527 | A1 | 10/2020 |

OTHER PUBLICATIONS

PCT International Search Report and Written Opinion completed by the ISA/US on Jun. 19, 2017 and issued in connection with PCT/US2017/030163.

PCT International Search Report and Written Opinion completed by the ISA/EP on Feb. 14, 2019 and issued in connection with PCT/US2018/051944.

PCT International Search Report and Written Opinion completed by the ISA/EP on Apr. 18, 2019 and issued in connection with PCT/US2019/013251.

PCT International Search Report and Written Opinion completed by the ISA/EP on Apr. 16, 2019 and issued in connection with PCT/US2019/013274.

PCT International Search Report and Written Opinion completed by the ISA/EP on Mar. 27, 2019 and issued in connection with PCT/US2019/013277.

PCT International Search Report and Written Opinion completed by the ISA/EP on Jul. 24, 2019 and issued in connection with PCT/US2019/013278.

PCT International Search Report and Written Opinion completed by the ISA/EP on Sep. 9, 2019 and issued in connection with PCT/US2019/013279.

PCT International Search Report and Written Opinion completed by the ISA/EP on Mar. 28, 2019 and issued in connection with PCT/US2019/013280.

PCT International Search Report and Written Opinion completed by the ISA/EP on Aug. 27, 2019 and issued in connection with PCT/US2019/013281.

PCT International Search Report and Written Opinion completed by the ISA/EP on Mar. 27, 2019 and issued in connection with PCT/US2019/013283.

PCT International Search Report and Written Opinion completed by the ISA/EP on Mar. 29, 2019 and issued in connection with PCT/US2019/013284.

(56) References Cited

OTHER PUBLICATIONS

PCT International Search Report and Written Opinion completed by the ISA/EP on Jul. 26, 2019 and issued in connection with PCT/US2019/013285.
PCT International Search Report and Written Opinion completed by the ISA/EP on Aug. 27, 2019 and issued in connection with PCT/US2019/035381.
PCT International Search Report and Written Opinion completed by the ISA/EP on Sep. 9, 2019 and issued in connection with PCT/US2019/035379.
PCT International Search Report and Written Opinion completed by the ISA/US on Jan. 24, 2021 and issued in connection with PCT/US2020/054975.
PCT International Search Report and Written Opinion completed by the ISA/EP on Mar. 8, 2021 and issued in connection with PCT/US2020/065300.
PCT International Search Report and Written Opinion completed by the ISA/EP on Mar. 8, 2021 and issued in connection with PCT/US2020/065301.
PCT International Search Report and Written Opinion completed by the ISA/US on Nov. 23, 2020 and issued in connection with PCT/US2020/052009.
PCT International Search Report and Written Opinion completed by the ISA/EP on Jul. 14, 2020 and issued in connection with PCT/US2020/029287.
PCT International Search Report and Written Opinion completed by the ISA/US on Mar. 18, 2021 and issued in connection with PCT/US2021/016325.
Supplemental European Search Report for European Patent Application No. 17790559.3 dated Nov. 12, 2019 (11 pages).
Anthony, et al., A simple electrospray interface based on a DC ion carpet, Int. J. Mass Spectrom. 371, 1-7 (2014).
Anthony, Staci N. "MS /MS instrumentation for megadalton-sized ions", 2016, XP055619426, ISBN: 978-1-369-02558-3 Retrieved from the Internet: URL:https://search.proquest.com/docview/1830450391?accountid=29404.
Bantel-Schaal, U., et al., "Human Adena-Associated Virus Type 5 Is Only Distantly Related to Other Known Primate Helper-Dependent Parvoviruses", Journal of Virology, vol. 73, pp. 939-947 (Feb. 1999).
Beuhler, et al., A study of the formation of high molecular weight water cluster ions (m/e<59000) in expansion of ionized gas mixtures, J. Chem. Phys. 77, 2549-2557 (1982).
Beuhler, et al., Threshold studies of secondary electron emission induced by macro ion impact on solid surfaces. Nucl. Instrum. Methods. 170, 309-315 (1980).
Botamanenko, Daniel, et al., "Ion-Ion Interactions in Charge Detection Mass Spectrometry", J Am Soc Mass Spectrom. Dec. 2019 ; 30(12): 2741-2749. doi:10.1007/s13361-019-02343-y.
Brancia, et al., Digital asymmetric waveform isolation (DAWI) in a digital linear ion trap. J_ Am. Soc_ Mass Spectrom. 1. 1530-1533 (2010).
Brown, Brooke Ann, et al., "Charge Detection Mass Spectrometry Measurements of Exosomes and other Extracellular Particles Enriched from Bovine Milk" Anal. Chem., Just Accepted Manuscript • DOI: 10.1021/acs.analchem.9b05173 • Publication Date (Web): Jan. 28, 2020 Downloaded from pubs.acs.org on Jan. 30, 2020.
Brown, C., et al. "Chimeric Parvovirus B19 Capsids for the Presentation of Foreign Epitope",; Virology 198, pp. 477-488 (1994).
Burnham, et al. "Analytical Ultracentrifugation as an Approach to Characterize Recombinant Adena-Associated Viral Vectors", Human Gene Therapy Methods, vol. 26, No. 6; pp. 228-242, Oct. 15, 2015.
Chao, Hengiun, et al. "Several Log Increase in Therapeutic Transgene Delivery by Distinct Adena-Associated Viral Serotype Vectors" Molecular Therapy vol. 2, No. 6, pp. 619-623 (Dec. 2000).
Japanese Office Action dispatched Jan. 31, 2023 for co-pending application 2020-568364—9 pages.
PCT International Search Report and Written Opinion completed by the ISA/US on Apr. 5, 2021 and issued in connection with PCT/US2021/016435.
Chiorini, John A., et al. "Cloning of Adeno-Associated Virus Type 4 (MV4) and Generation of Recombinant MV4 Particles", Journal of Virology, vol. 71, pp. 6823-6833 (Sep. 1997).
Chiorini, John A., "Cloning and Characterization of Adeno-Associated Virus Type 5", Journal of Virology, vol. 73, DP-1309-1319 (Feb. 1999).
Chernushevich, et al., Collisional cooling of large ions in electrospray mass spectrometry. Anal. Chem 76. H54-1760 (2004).
Cleves, Ann E., "Protein transport: The nonclassical ins and outs", Current Biology, vol. 7, No. 5, pp. 318-320 (1997).
Contino, Nathan Colby, "Ion trap charge detection mass spectrometry: Lowering limits of detection and improving signal to noise", ISBN: 9781303535048, Jul. 30, 2013 (Jul. 30, 2013).
Ding, et al., A simulation study of the digital ion trap mass spectrometer. Int. J. Mass Spectrom. 221, 117-138 (2002).
Ding, et al., A digital ion trap mass spectrometer coupled with atmospheric pressure ion sources. J. Mass Spectrom. 69, 471-484 (2004).
Douglas J_ Linear quadrupoles in mass spectrometry. Mass Spectrom. Rev. 28, 937-960 (2009).
Doussineau, Tristan, et al. "Infrared multiphoton dissociation tandem charge detection-mass spectrometry of single megadalton electrosprayed ions", Review of Scientific Instruments, AIP, Melville, NY, US, vol. 82, No. 8, Aug. 1, 2011, pp. 84104-84104.
Draper, Benjamin E., et al. "The FUNPET—a New Hybrid Ion Funnel-Ion Carpet Atmospheric Pressure Interface for the Simultaneous Transmission of a Broad Mass Range", Journal of the American Society for Mass Spectrometry, Elsevier Science Inc, US, vol. 29, No. 11, Aug. 15, 2018, pp. 2160-2172.
Draper, Benjamin E., et al., "Real-Time Analysis and Signal Optimization for Charge Detection Mass Spectrometry", J. Am. Soc. Mass Spectrom. (2019) 30:898Y904.
El-Baba, Tarick J. et al., "Melting proteins confined in nanodroplets with 10.6 [mu]m light provides clues about early steps of denaturation", Chemical Communications, vol. 54, No. 26, Mar. 8, 2018 (Mar. 8, 2018), p. 3270-3273.
Elliott, Andrew G., et al. "Simultaneous Measurements of Mass and Collisional Cross-Section of Single Ions with charge Detection Mass Spectrometry", Analytical Chemistry, vol. 89, No. 14, Jun. 16, 2017, pp. 7701-7708.
Elliott, Andrew G., et al. "Single Particle Analyzer of Mass: A Charge Detection Mass Spectrometer with a Multi-Detector Electrostatic Ion Trap", International Journal of Mass Spectrometry, Elsevier Science Publishers, Amsterdam, NL, vol. 414, Jan. 15, 2017, pp. 45-55.
Elliott, Andrew G., et al. "Effects of Individual Ion Energies on Charge Measurements in Fourier Transform Charge Detection Mass Spectrometry (FT-CDMS)", Journal of the American Society for Mass Spectrometry., Nov. 14, 2018 (Nov. 14, 2018).
Fuerstenau, et al., "Mass Spectrometry of an Intact Virus", Agnew. Chem. 2001, 559-562.
Gao, Guangping, et al. "Clades of Adeno-Associated Viruses Are Widely Disseminated in Human Tissues", vol. 78, pp. 6381-6388 (Jun. 2004).
Gao, Guangping, et al. "Novel Adeno-Associated Viruses from Rhesus Monkeys as Vectors for Human Gene Therap", .; National Academy of Sciences, vol. 99, No. 18, pp. 11854-11859 (Sep. 3, 2002).
Gorman, Linda, et al. "Stable Alteration of Pre-mRNA Splicing Patterns by Modified U7 Small Nuclear RNAs", National Academy of Sciences, vol. 95, No. 9, pp. 4929-4934 (Apr. 28, 1998).
Grifman, M., et al. "Incorporation of Tumor-Targeting Peptides into Recombinant Adeno-associated Virus Capsids",.; Molecular Therapy, vol. 3, No. 6, pp. 964-975 (Jun. 2001).
Grinfeld, Dmitry, et al. "Space-Charge Effects in an Electrostatic Multireflection Ion Trap", European Journal of Mass Spectrometry, vol. 20, No. 2, Apr. 1, 2014 (Apr. 1, 2014), p. 131-142.
Hauck, B., et al. "Characterization of Tissue Tropism Determinants of Adeno-Associated Virus Type 1", Journal of Virology, vol. 77, No. 4, pp. 2768-2774 (Feb. 2003).

(56) References Cited

OTHER PUBLICATIONS

Heller, Manfred, et al. "Mass spectrometry-based analytical tools for the molecular protein characterization of human plasma lipoproteins", Proteomics, vol. 5, No. 19, Jul. 1 (205-97-91) , pp. 2619-2639, 2005.
Hogan, Joanna, et al. "Optimized Electrostatic Linear Ion Trap for Charge Detection Mass Spectrometry", Jul. 9, 2018 (Jul. 9, 2018), vol. 29, No. 10, p. 2086-2095.
Hutchins, Patrick M., et al. "Quantification of HDL Particle Concentration by Calibrated Ion Mobility Analysis", Clinical Chemistry 60:11, 1393-1401, 2014.
Keifer, David Z., "Single-Molecule Mass Spectrometry", Mass Spectrometry Reviews, vol. 36 pp. 715-733 (2017).
Keifer, David Z., et al. "Charge detection mass spectrometry: weighing heavier things" The Analyst, vol. 142, No. 10, Jan. 1, 2017, pp. 1654-1671.
Keifer, David Z., et al. "Charge Detection Mass Spectrometry with Almost Perfect Charge Accuracy", Analytical Chemistry, vol. 87, No. 20, Oct. 20, 2015, pp. 10330-10337.
Keifer, David et al., "Charge Detection Mass Spectrometry of Bacteriophage P22 Procapsid Distributions Above 20MDa", Rapid Communications in Mass Spectrometry, vol. 28, No. 5 , 2014.
Kelly, Ryan T., et al. "The ion funnel: Theory, implementations, and applications", Mass Spectrometry Reviews., vol. 29, Apr. 23, 2009, pp. 294-312.
Kim et al., A multicapillary inlet jet disruption electrodynamic ion funnel interface for improved sensitivity using atmospheric pressure ion sources. Anal. Chem. 73, 4162-4170 (2001).
Koizumi et al., A novel phase-coherent programmable clock for high-precision arbitrary waveform generation applied o digital ion trap mass spectrometry_ Int. J_ Mass Spectrom_ 292, 23-31 (2010).
Konenkov et al., Matrix methods for the calculation of stability diagrams in quadrupole mass spectrometry. J. Amer. Soc. Mass Spec. 13, 597-613 (2002).
Kosaka, Nobuyoshi, et al., "Versatile roles of extracellular vesicles in cancer," J Clin Invest. 2016;126(4):1163-1172. https://doi.org/10.1172/JCI81130.
Kukreja, Alexander A., et al. "Structurally Similar Woodchuck and Human Hepadnavirus Core Proteins Having Distinctly Different Temperature Dependencies of Assembly" Journal of Virology, vol. 68, No. 24, 14105-14115, Sep. 24, 2014.
Landais et al., Varying the radio frequency: A new scanning mode for quadrupole analyzers. Rapid Commun. Mass Spectrom. 12, 302-306 (1998).
Makarov, Alexander, "Electrostatic Axially Harmonic Orbital Trapping: A High-Performance Technique of Mass Analysis", Analytical Chemistry,vol. 72, No. 6, Mar. 1, 2000 (Mar. 1, 2000), p. 1156-1162.
Marmet et al., A frequency-swept quadrupole mass filler. Int. J_ Mass Spectrom. Ion Proc. 42, 3-10 (1982).
Martin, Stability of doubly charged alkali halide clusters. J_ Chem. Phys. 76, 5467-5469 (1982).
Miyamura, K., et al. "Parvovirus Particles as Platforms for Protein Presentation", National Academy of Sciences, vol. 1,No. 18,pp. 8507-8511 (Aug. 30, 1994).
Mori, Seiichiro, Mori, et al. "Two novel adeno-associated viruses from cynomolgus monkey: pseudotyping characterization of capsid protein", Virology 330, pp. 375-383 (2004).
Muramatsu, S., et al. "Nucleotide Sequencing and Generation of an Infectious Clone of Adeno-Associated Virus 3", Virology vol. 221; Article No. 0367; pp. 208-217 (1996).
Muzyczka, N., "Use of Adeno-Associated Virus as a General Transduction Vector for Mammalian Cells", Current Topics n Microbiology and Immunology, vol. 158, pp. 97-129 (1992).
Nie et al., Frequency scan of a quadrupole mass analyzer in the third stability region for protein analysis. J. Chin. Chem_ Soc., 53, 47-52 (2006).
Padron, Eric, et al. "Structure of Adeno-Associated Virus Type 4", Journal of Virology, vol. 79, No. 8, pp. 5047-5058 Apr. 2005).
Puttaraju, M., et al. "Spliceosome-mediated RNA trans-splicing as a tool for gene therapy", Nature Biotechnology, vol. 17, pp. 246-252 (Mar. 1999).
Japanese Office Action dispatched Jan. 24, 2023 for co-pending application 2021-527871—4 pages (Prior art reference Alexander Makarov has been previously submitted).
Office Action and Search Report for CN patent application No. 201980051696.1, dated Sep. 25, 2023. (translation appended).
Japanese Office Action dispatched Feb. 17, 2023 for application 2020-568389—11 pages.
European Office Action issued Mar. 3, 2023 for application 19732193. 8—14 pages.
Japanese Office Action dispatched Jan. 6, 2023 for application 2020-568366—9 pages.
Japanese Office Action dispatched Jan. 18, 2023 for 2020-568469—16 pages.
Japanese Office Action dispatched Jan. 18, 2023 for application 2020-568379—11 pages.
PCT International Search Report and Written Opinion completed by the ISA/US on Oct. 11, 2021 and issued in connection with PCT/US2021/034480.
Fernandez-Maestre et al. "Ammonia as a Modifier in Ion Mobility Spectrometry: Effects on Ion Mobilities and Potential as a Separation Tool", J. Chil. Chem. Soc. 2014. 59, No. 1, especially: abstract; p. 2398, col. 1, para 1; p. 2398, col. 1, para 2; p. 2398, col. 2, para 2; p. 2399, Figure 1; p. 2402, col. 1, para 1; p. 2402, col. 2, para 1; Figure 6a. Figure 6b.
Kafle et al. "Understanding gas phase modifier interactions in rapid analysis by Differential Mobility-Tandem Mass Spectrometry", J Am Soc Mass Spectrom. 2014. 25(7): pp. 1098-1113, especially: p. 7, para 2; p. 10, para 5; p. 11, para 1.
Kiss et al. "Size, weight and position: ion mobility spectrometry and imaging MS combined", Anal Bioanal Chem. 2011. 399: pp. 2623-2634, especially: p. 2626, col. 1, para 1.
Paul et al., Das elektrische massenfilter als massenspektromeler und isotopenlrenner. Z. Phys. 152, 143-182 (1958).
Paul, et al., Das elektrische massenfiller, Z. Phys. 140, 262-273 (1955).
Pierson, Elizabeth E., et al., Charge Detection Mass Spectrometry for Single Ions with an Uncertainty in the Charge Measurement of 0.65 e; Elizabeth E_ Pierson et al.; Journal American Society for Mass Spectrometry, vol. 26, pp. 1213-1220 (2015).
Pierson, Elizabeth E., et al. "Charge Detection Mass Spectrometry Identifies Preferred Non-icosahedral Polymorphs in the Self-Assembly of Woodchuck Hepatitis Virus Capsids", Jour. of Molecular Biology, vol. 428, Issue 2, pp. 292-300. Jan. 29, 2016.
Pierson, Elizabeth E., et al., "Detection of 1-15 Late Intermediates in Virus Capsid Assembly by Charge Detection Mass Spectrometry", Journal of the American Chemical Society, vol. 136, No. 9, Feb. 19, 2014, 3536-3541.
Pierson, Elizabeth, "Charge Detection Mass Spectrometry: Instrumentation & Applications to Viruses", Proquest Dissertations and Theses; Thesis (Ph.D.) vol. 76-09(E), Section: B. 168, 2015.
Richards et al., A new operating mode for the quadrupole mass filler. Int. J. Mass Spectrom. Ion Phys. 12, 317-339 1973).
Richards et al., Waveform parameter tolerances for the quadrupole mass filler with rectangular excitation. Int. J. Mass Spectrom. Ion Phys_ 15, 417-428 (1974).
Schlunegger et al., Frequency scan for the analysis of high mass ions generated by matrix-assisted laser esorption/ionization in a Paul trap_ Rapid Commun. Mass Spectrom. 13, 1792-1796 (1999).
Sonalikar, Hrishikesh S., et al. "Numerical analysis of segmented-electrode Orbitraps", International Journal of Mass Spectrometry, Elsevier Science Publishers, Amsterdam, NL,vol. 395, Dec. 17, 2015 (Dec. 17, 2015), p. 36-48.
Shinholt, Deven L., et al., "A Frequency and Amplitude Scanned Quadrupole Mass Filter for the Analysis of High m/z Ions", Review of Scientific Instruments 85, 113109 (2014) (Received Sep. 11, 2014; accepted Oct. 17, 2014; published online Nov. 21, 2014).
Snijder, J., et al., "Defining the Stoichiometry and Cargo Load of Viral and Bacterial Nanoparticles by Orbitrap Mass Spectrometry", J. Am. Chem. Soc. 2014, 136, 7295-7299.

(56) References Cited

OTHER PUBLICATIONS

Sobott et al., A tandem mass spectrometer for improved transmission and analysis of large macromolecular Assemblies. Anal. Chem. 74, 1402-1407 (2002).
Syed, et al., Quadrupole mass filler: Design and performance for operation in stability zone 3. J. Am. Soc. Mass Spectrom. 24, 1493-1500 (2013).
Shade, Rosemary, et al. "Nucleotide Sequence and Genome Organization of Human Parvovirus B19 Isolated from the Serum of a Child during plastic Crisis", Journal of Virology, vol. 58, No. 3, pp. 921-936 (Jun. 1986).
Sharp, Phillip A., et al. "RNA Interference", American Association for the Advancement of Science; Science, New Series, vol. 287, No. 5462, pp. 2431-2433 (Mar. 31, 2000).
Shi, Z., et al. "Insertional Mutagenesis at Positions 520 and 584 of Adena-Associated Virus Type 2 (MV2) Capsid Gene and Generation of MV2 Vectors with Eliminated Heparin-Binding Ability and Introduced Novel Tropism", Human Gene Therapy, vol. 17, pp. 353-361 (Mar. 2006).
Srivastava, Arun, et al., "Nucleotide Sequence and Organization of the Adena-Associated Virus 2 Genome", Journal of Virology, vol. 45, No. 2, pp. 555-564 (Feb. 1983).
Tsao, Jun, et al., "The Three-Dimensional Structure of Canine Parvovirus and Its Functional Implications", American Association for the Advancement of Science, Science, New Series, vol. 251, No. 5000, pp. 1456-1464 (Mar. 22, 1991).
Todd, Aaron R., et al. "Implementation of a Charge-Sensitive Amplifier without a Feedback Resistor for Charge Detection Mass Spectrometry Reduces Noise and Enables Detection of Individual Ions Carrying a Single Charge", J. Am. Soc. Mass Spectrom. 2020, 31, 146-154.
Walters, Robert W., "Structure of Adeno-Associated Virus Serotype 5", Journal of Virology, vol. 78, No. 7, pp. B361-3371 (Apr. 2004).
Winger, Brian E., et al., "Observation and Implications of High Mass-to-Charge Ratio Ions from Electrospray Ionization Mass Spectrometry," 1993 American Society for Mass Spectrometry 4, 536-545.
Wang, Lei, et al., "Expanding the Genetic Code", Annual Review of Biophysics and Biomolecular Structure, vol. 35, pp. 25-249 (2006).
Weiss, Victor U., et al, "Analysis of a Common Cold Virus and Its Subviral Particles by Gas-Phase Electrophoretic Mobility Molecular Analysis and Native Mass Spectrometry", Anal Chem. 2015.
Wright, J. Fraser, "Product-Related Impurities in Clinical-Grade Recombinant AAV Vectors: Characterization and Risk Assessment", Biomedicines 2014, 2, 80-97.
Xie, Qing, et al., "Canine Parvovirus Capsid Structure, Analyzed at 2.9 A Resolution", Journal of Molecular Biology, vol. 64, pp. 497-520 (1996).
Xie, Qing, et al., "The atomic structure of adeno-associated virus (MV-2), a vector for human gene therapy", PNAS, vol. 99, No. 16, pp. 10405-10410 (Aug. 6, 2002).
Xiao, Weidong, et al., "Gene Therapy Vectors Based on Adena-Associated Virus Type 1", Journal of Virology, vol. 73, No. 5, pp. 3994-4003 (May 1999).
Uetrecht et al., "Stability and Shape of Hepatitis B Virus Capsids In Vacuo", Angew. Chem. Int. Ed. 2008, 47, 6247-6251.
Uetrecht et al., "High-resolution mass spectrometry of viral assemblies: Molecular composition and stability of dimorphic hepatitis B virus capsids", PNAS 2008, vol. 105, 9216-9920.
Xiong, et al., The development of charge detection-quadrupole ion trap mass spectrometry driven by rectangular and riangularwaves, Analyst 137, 1199-1204 (2012).
Yang, et al., Development of a palm portable mass spectrometer. J. Amer. Soc. Mass Spec. 19, 1442-1448 (2008).
Yost, et al., Selected ion fragmentation with a tandem quadrupole mass spectrometer. J. Am. Chem. Soc. 100, 274-2275 (1978).
Bioconjugate Techniques; Hermanson;Academic Press, 1st Edition (1996), (book reference, chapter guide attached; book/specific chapter(s) to be made available upon request).
European Office Action dated Sep. 2, 2021 for application 19 707 901.5—5 pages.
Extended EP Search Report completed Aug. 29, 2024 and issued in connection with EP Appln. No. 24174366., 12 pages.
English translation of an Office Action for Japanese Patent Appln. No. 2022-547047, dated Aug. 1, 2024.

* cited by examiner

200

TIME-DOMAIN ANALYSIS OF SIGNALS FOR CHARGE DETECTION MASS SPECTROMETRY

CROSS-REFERENCE TO RELATED APPLICATIONS

This application is a U.S. national stage entry of PCT Application No. PCT/US2021/016435, filed Feb. 3, 2021, which claims the benefit of, and priority to U.S. Provisional Patent Application Ser. No. 62/969,325, filed Feb. 3, 2020, the disclosures of which are incorporated herein by reference in their entireties.

GOVERNMENT RIGHTS

This invention was made with government support under GM1311100 awarded by the National Institutes of Health. The United States Government has certain rights in the invention.

TECHNICAL FIELD

The present disclosure relates generally to charge detection mass spectrometry instruments, and more specifically to performing mass and charge measurements with such instruments.

BACKGROUND

Charge detection mass spectrometry (CDMS) is a particle analysis technique in which the mass of an ion is determined by simultaneously measuring its mass-to-charge ratio, typically referred to as "m/z," and charge. In some CDMS instruments, an electrostatic linear ion trap (ELIT) is used to conduct such measurements.

SUMMARY

The present disclosure may comprise one or more of the features recited in the attached claims, and/or one or more of the following features and combinations thereof. In one aspect, a charge detection mass spectrometer (CDMS) may comprise an electrostatic linear ion trap (ELIT), a source of ions configured to supply ions to the ELIT, a charge sensitive preamplifier having an input operatively coupled to the ELIT, at least one processor operatively coupled to the ELIT and to an output of the amplifier, and at least one memory having instructions stored therein which, when executed by the at least one processor, cause the at least one processor to (a) control the ELIT to trap therein an ion supplied by the ion source, (b) collect ion measurement information based on output signals produced by the charge sensitive preamplifier as the trapped ion oscillates back and forth through the ELIT, the ion measurement information including charge induced by the ion on a charge detector of the ELIT during each pass of the ion through the ELIT and timing of the induced charges relative to one another, (c) process the ion measurement information in the time-domain for each of a plurality of sequential time windows of the ion measurement information to determine a charge magnitude of the ion during each time window, and (d) determine the magnitude of charge of the trapped ion based on the charge magnitudes of each of the time windows In another aspect, a method is provided for measuring a charge of an ion in an electrostatic linear ion trap including a charge detection cylinder positioned between two ion mirrors, in which during an ion trapping event the ion repeatedly oscillates back and forth between the two ion mirrors each time passing through and inducing a corresponding charge on the charge detection cylinder and in which an ion measurement signal including magnitudes of the induced charges and timing of the induced charges during the trapping event are recorded in an ion measurement file. The method may comprise (a) establishing a time window of the ion measurement signal at the beginning of the ion measurement file, (b) generating a simulated ion measurement signal for the time window of the ion measurement signal using input parameters including estimates of signal frequency, charge magnitude, signal phase and duty cycle, (c) iteratively processing a variance between the time window of the ion measurement signal and the simulated ion measurement signal by adjusting values of the input parameters until the variance reaches convergence, (d) recording a charge magnitude value resulting from (c), (e) advancing the time window of the ion measurement signal by an incremental time amount, (f) repeating (b)-(d) until the time window reaches the end of the ion measurement file, and (g) determining the charge of the ion based on the charge magnitude values of each of the time windows.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to apparatuses and techniques for processing time-domain ion measurement signals, produced by an electrostatic linear ion trap (ELIT) of a charge detection mass spectrometer (CDMS), to simultaneously determine ion mass-to-charge ratio and ion charge from which ion mass can then be determined. For purposes of this disclosure, the phrase "charge detection event" is defined as detection of a charge induced on a charge detector of the ELIT by an ion passing a single time through the charge detector, and the phrase "ion measurement event" is defined as a collection of charge detection events resulting from oscillation of an ion back and forth through the charge detector a selected number of times or for a selected time period. As the oscillation of an ion back and forth through the charge detector results from controlled trapping of the ion within the ELIT, as will be described in detail below, the phrase "ion measurement event" may alternatively be referred to herein as an "ion trapping event" or simply as a "trapping event," and the phrases "ion measurement event," "ion trapping event", "trapping event" and variants thereof shall be understood to be synonymous with one another.

Figure 1:
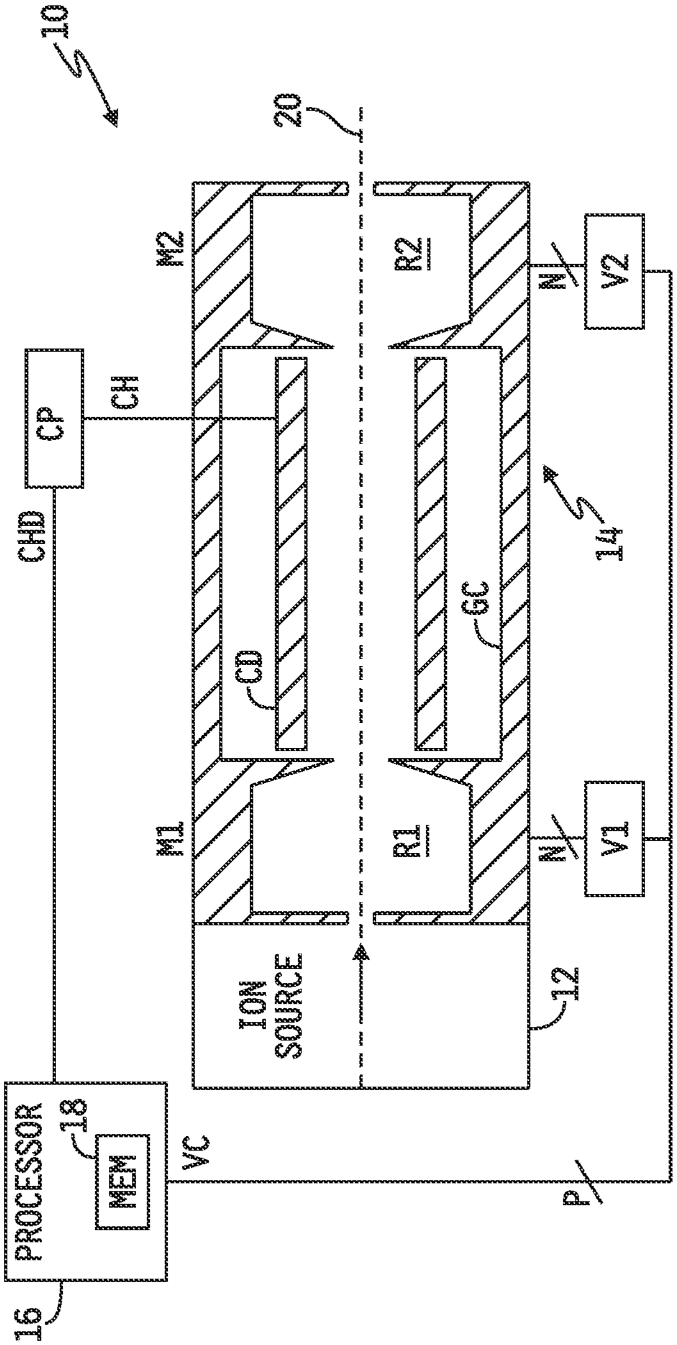
FIG. 1 is a simplified diagram of a CDMS system including an embodiment of an electrostatic linear ion trap (ELIT) with control and measurement components coupled thereto.

Referring to FIG. 1, a CDMS system 10 is shown including an embodiment of an electrostatic linear ion trap (ELIT) 14 with control and measurement components coupled thereto. In the illustrated embodiment, the CDMS system 10 includes an ion source 12 operatively coupled to an inlet of the ELIT 14. The ion source 12 illustratively includes any conventional device or apparatus for generating ions from a sample and may further include one or more devices and/or instruments for separating, collecting, filtering, fragmenting and/or normalizing or shifting charge states of ions according to one or more molecular characteristics. As one illustrative example, which should not be considered to be limiting in any way, the ion source 12 may include a conventional electrospray ionization source, a matrix-assisted laser desorption ionization (MALDI) source or the like, coupled to an inlet of a conventional mass spectrometer. The mass spectrometer may be of any conventional design including, for example, but not limited to a time-of-flight (TOF) mass spectrometer, a reflectron mass spectrometer, a Fourier transform ion cyclotron resonance (FTICR) mass spectrometer, a quadrupole mass spectrometer, a triple quadrupole mass spectrometer, a magnetic sector mass spectrometer, or the like. In any case, the ion outlet of the mass spectrometer is operatively coupled to an ion inlet of the ELIT 14. The sample from which the ions are generated may be any biological or other material.

In the illustrated embodiment, the ELIT 14 illustratively includes a charge detector CD surrounded by a ground chamber or cylinder GC and operatively coupled to opposing ion mirrors M1, M2 respectively positioned at opposite ends thereof. The ion mirror M1 is operatively positioned between the ion source 12 and one end of the charge detector CD, and ion mirror M2 is operatively positioned at the opposite end of the charge detector CD. Each ion mirror M1, M2 defines a respective ion mirror region R1, R2 therein. The regions R1, R2 of the ion mirrors M1, M2, the charge detector CD, and the spaces between the charge detector CD and the ion mirrors M1, M2 together define a longitudinal axis 20 centrally therethrough which illustratively represents an ideal ion travel path through the ELIT 14 and between the ion mirrors M1, M2 as will be described in greater detail below.

In the illustrated embodiment, voltage sources V1, V2 are electrically connected to the ion mirrors M1, M2 respectively. Each voltage source V1, V2 illustratively includes one or more switchable DC voltage sources which may be controlled or programmed to selectively produce a number, N, programmable or controllable voltages, wherein N may be any positive integer. Illustrative examples of such voltages will be described below with respect to FIGS. 2A and 2B to establish one of two different operating modes of each of the ion mirrors M1, M2 as will be described in detail below. In any case, ions move within the ELIT 14 close to the longitudinal axis 20 extending centrally through the charge detector CD and the ion mirrors M1, M2 under the influence of electric fields selectively established by the voltage sources V1, V2.

The voltage sources V1, V2 are illustratively shown electrically connected by a number, P, of signal paths to a conventional processor 16 including a memory 18 having instructions stored therein which, when executed by the processor 16, cause the processor 16 to control the voltage sources V1, V2 to produce desired DC output voltages for selectively establishing ion transmission and ion reflection electric fields, TEF, REF respectively, within the regions R1, R2 of the respective ion mirrors M1, M2. P may be any positive integer. In some alternate embodiments, either or both of the voltage sources V1, V2 may be programmable to selectively produce one or more constant output voltages. In other alternative embodiments, either or both of the voltage sources V1, V2 may be configured to produce one or more time-varying output voltages of any desired shape. It will be understood that more or fewer voltage sources may be electrically connected to the mirrors M1, M2 in alternate embodiments.

The charge detector CD is illustratively provided in the form of an electrically conductive cylinder which is electrically connected to a signal input of a charge sensitive preamplifier CP, and the signal output of the charge-sensitive preamplifier CP is electrically connected to the processor 16. The voltage sources V1, V2 are illustratively controlled in a manner, as described in detail below, which selectively traps an ion entering the ELIT 14 and causes it to oscillate therein back and forth between the ion mirrors M1, M2 such that the trapped ion repeatedly passes through the charge detector CD. With an ion trapped within the ELIT 14 and oscillating back and forth between the ion mirrors M1, M2, the charge sensitive preamplifier CP is illustratively operable in a conventional manner to detect charges (CH) induced on the charge detection cylinder CD as the ion passes through the charge detection cylinder CD between the ion mirrors M1, M2, to produce charge detection signals (CHD) corresponding thereto. The charge detection signals CHD are illustratively recorded in the form of oscillation period values and, in this regard, each oscillation period value represents ion measurement information for a single, respective charge detection event. A plurality of such oscillation period values are measured and recorded for the trapped ion during a respective ion measurement event (i.e., during an ion trapping event), and the resulting plurality of recorded oscillation period values i.e., the collection of recorded ion measurement information, for the ion measurement event, is processed to determine ion charge, mass-to-charge ratio and/or mass values as will be described below. Multiple ion measurement events can be processed in this manner, and a mass-to-charge ratio and/or mass spectrum of the sample may illustratively be constructed therefrom.

Figure 2A:
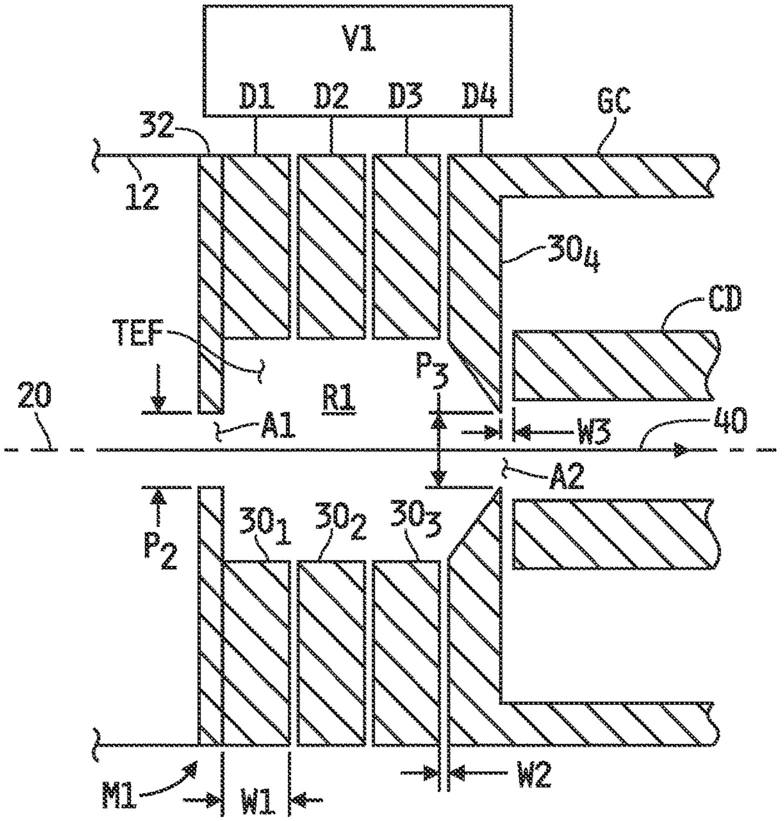
FIG. 2A is a magnified view of the ion mirror M1 of the ELIT illustrated in FIG. 1 in which the mirror electrodes of M1 are controlled to produce an ion transmission electric field therein.
Figure 2B:
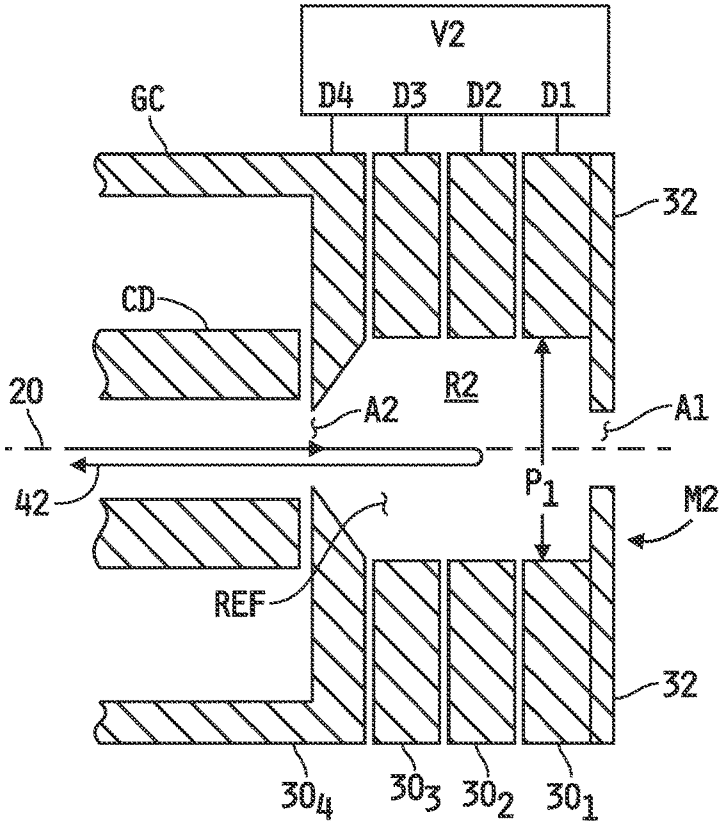
FIG. 2B is a magnified view of the ion mirror M2 of the ELIT illustrated in FIG. 1 in which the mirror electrodes of M2 are controlled to produce an ion reflection electric field therein.

Referring now to FIGS. 2A and 2B, embodiments are shown of the ion mirrors M1, M2 respectively of the ELIT 14 depicted in FIG. 1. Illustratively, the ion mirrors M1, M2 are identical to one another in that each includes a cascaded arrangement of 4 spaced-apart, electrically conductive mirror electrodes. For each of the ion mirrors M1, M2, a first mirror electrode $\mathbf{30}_1$ has a thickness W1 and defines a passageway centrally therethrough of diameter P1. An endcap 32 is affixed or otherwise coupled to an outer surface of the first mirror electrode $\mathbf{30}_1$ and defines an aperture A1 centrally therethrough which serves as an ion entrance and/or exit to and/or from the corresponding ion mirror M1, M2 respectively. In the case of the ion mirror M1, the endcap 32 is coupled to, or is part of, an ion exit of the ion source 12 illustrated in FIG. 1. The aperture A1 for each endcap 32 illustratively has a diameter P2.

A second mirror electrode $\mathbf{30}_2$ of each ion mirror M1, M2 is spaced apart from the first mirror electrode $\mathbf{30}_1$ by a space having width W2. The second mirror electrode $\mathbf{30}_2$, like the mirror electrode $\mathbf{30}_1$, has thickness W1 and defines a passageway centrally therethrough of diameter P2. A third mirror electrode $\mathbf{30}_3$ of each ion mirror M1, M2 is likewise spaced apart from the second mirror electrode $\mathbf{30}_2$ by a space of width W2. The third mirror electrode $\mathbf{30}_3$ has thickness W1 and defines a passageway centrally therethrough of width P1.

A fourth mirror electrode $\mathbf{30}_4$ is spaced apart from the third mirror electrode $\mathbf{30}_3$ by a space of width W2. The fourth mirror electrode $\mathbf{30}_4$ illustratively has a thickness of W1 and is formed by a respective end of the ground cylinder, GC disposed about the charge detector CD. The fourth mirror electrode $\mathbf{30}_4$ defines an aperture A2 centrally therethrough which is illustratively conical in shape and increases linearly between the internal and external faces of the ground cylinder GC from a diameter P3 defined at the internal face of the ground cylinder GC to the diameter P1 at the external face of the ground cylinder GC (which is also the internal face of the respective ion mirror M1, M2).

The spaces defined between the mirror electrodes $\mathbf{30}_1$-$\mathbf{30}_4$ may be voids in some embodiments, i.e., vacuum gaps, and in other embodiments such spaces may be filled with one or more electrically non-conductive, e.g., dielectric, materials. The mirror electrodes $\mathbf{30}_1$-$\mathbf{30}_4$ and the endcaps 32 are axially aligned, i.e., collinear, such that a longitudinal axis 22 passes centrally through each aligned passageway and also centrally through the apertures A1, A2. In embodiments in which the spaces between the mirror electrodes $\mathbf{30}_1$-$\mathbf{30}_4$ include one or more electrically non-conductive materials, such materials will likewise define respective passageways therethrough which are axially aligned, i.e., collinear, with the passageways defined through the mirror electrodes $\mathbf{30}_1$-$\mathbf{30}_4$ and which illustratively have diameters of P2 or greater. Illustratively, P1>P3>P2, although in other embodiments other relative diameter arrangements are possible.

A region R1 is defined between the apertures A1, A2 of the ion mirror M1, and another region R2 is likewise defined between the apertures A1, A2 of the ion mirror M2. The regions R1, R2 are illustratively identical to one another in shape and in volume.

As described above, the charge detector CD is illustratively provided in the form of an elongated, electrically conductive cylinder positioned and spaced apart between corresponding ones of the ion mirrors M1, M2 by a space of width W3. In one embodiment, W1>W3>W2, and P1>P3>P2, although in alternate embodiments other relative width arrangements are possible. In any case, the longitudinal axis 20 illustratively extends centrally through the passageway defined through the charge detection cylinder CD, such that the longitudinal axis 20 extends centrally through the combination of the ion mirrors M1, M2 and the charge detection cylinder CD. In operation, the ground cylinder GC is illustratively controlled to ground potential such that the fourth mirror electrode $\mathbf{30}_4$ of each ion mirror M1, M2 is at ground potential at all times. In some alternate embodiments, the fourth mirror electrode $\mathbf{30}_4$ of either or both of the ion mirrors M1, M2 may be set to any desired DC reference potential, or to a switchable DC or other time-varying voltage source.

In the embodiment illustrated in FIGS. 2A and 2B, the voltage sources V1, V2 are each configured to each produce four DC voltages D1-D4, and to supply the voltages D1-D4 to a respective one of the mirror electrodes $\mathbf{30}_1$-$\mathbf{30}_4$ of the respective ion mirror M1, M2. In some embodiments in which one or more of the mirror electrodes $\mathbf{30}_1$-$\mathbf{30}_4$ is to be held at ground potential at all times, the one or more such mirror electrodes $\mathbf{30}_1$-$\mathbf{30}_4$ may alternatively be electrically connected to the ground reference of the respective voltage supply V1, V2 and the corresponding one or more voltage outputs D1-D4 may be omitted. Alternatively or additionally, in embodiments in which any two or more of the mirror electrodes $\mathbf{30}_1$-$\mathbf{30}_4$ are to be controlled to the same non-zero DC values, any such two or more mirror electrodes $\mathbf{30}_1$-$\mathbf{30}_4$ may be electrically connected to a single one of the voltage outputs D1-D4 and superfluous ones of the output voltages D1-D4 may be omitted.

Each ion mirror M1, M2 is illustratively controllable and switchable, by selective application of the voltages D1-D4, between an ion transmission mode (FIG. 2A) in which the voltages D1-D4 produced by the respective voltage source V1, V2 establishes an ion transmission electric field (TEF) in the respective region R1, R2 thereof, and an ion reflection mode (FIG. 2B) in which the voltages D1-D4 produced by the respect voltage source V1, V2 establishes an ion reflection electric field (REF) in the respective region R1, R2 thereof. As illustrated by example in FIG. 2A, once an ion from the ion source 12 flies into the region R1 of the ion mirror M1 through the inlet aperture A1 of the ion mirror M1, the ion is focused toward the longitudinal axis 20 of the ELIT 14 by an ion transmission electric field TEF established in the region R1 of the ion mirror M1 via selective control of the voltages D1-D4 of V1. As a result of the focusing effect of the transmission electric field TEF in the region R1 of the ion mirror M1, the ion exiting the region R1 of the ion mirror M1 through the aperture A2 of the ground chamber GC attains a narrow trajectory into and through the charge detector CD, i.e., so as to maintain a path of ion travel through the charge detector CD that is close to the longitudinal axis 20. An identical ion transmission electric field TEF may be selectively established within the region R2 of the ion mirror M2 via like control of the voltages D1-D4 of the voltage source V2. In the ion transmission mode, an ion entering the region R2 from the charge detection cylinder CD via the aperture A2 of M2 is focused toward the longitudinal axis 20 by the ion transmission electric field TEF within the region R2 so that the ion exits the aperture A1 of the ion mirror M2.

As illustrated by example in FIG. 2B, an ion reflection electric field REF established in the region R2 of the ion mirror M2 via selective control of the voltages D1-D4 of V2 acts to decelerate and stop an ion entering the ion region R2 from the charge detection cylinder CD via the ion inlet aperture A2 of M2, to accelerate the stopped ion in the opposite direction back through the aperture A2 of M2 and into the end of the charge detection cylinder CD adjacent to M2 as depicted by the ion trajectory 42, and to focus the ion toward the central, longitudinal axis 20 within the region R2 of the ion mirror M2 so as to maintain a narrow trajectory of the ion back through the charge detector CD toward the ion mirror M1. An identical ion reflection electric field REF may be selectively established within the region R1 of the ion mirror M1 via like control of the voltages D1-D4 of the voltage source V1. In the ion reflection mode, an ion entering the region R1 from the charge detection cylinder CD via the aperture A2 of M1 is decelerated and stopped by the ion reflection electric field REF established within the region R1, then accelerated in the opposite direction back through the aperture A2 of M1 and into the end of the charge detection cylinder CD adjacent to M1, and focused toward the central, longitudinal axis 20 within the region R1 of the ion mirror M1 so as to maintain a narrow trajectory of the ion back through the charge detector CD toward the ion mirror M1. An ion that traverses the length of the ELIT 14 and is reflected by the ion reflection electric field REF in the ion regions R1, R2 in a manner that enables the ion to continue traveling back and forth through the charge detection cylinder CD between the ion mirrors M1, M2 as just described is considered to be trapped within the ELIT 14.

Example sets of output voltages D1-D4 produced by the voltage sources V1, V2 respectively to control a respective ion mirrors M1, M2 to the ion transmission and reflection modes described above are shown in TABLE I below. It will be understood that the following values of D1-D4 are provided only by way of example, and that other values of one or more of D1-D4 may alternatively be used.

TABLE 1

| Ion Mirror Operating Mode | Output Voltages (volts DC) |
|---|---|
| Transmission | V1: D1 = 0, D2 = 95, D3 = 135, D4 = 0 |
| | V2: D1 = 0, D2 = 95, D3 = 135, D4 = 0 |
| Reflection | V1: D1 = 190, D2 = 125, D3 = 135, D4 = 0 |
| | V2: D1 = 190, D2 = 125, D3 = 135, D4 = 0 |

While the ion mirrors M1, M2 and the charge detection cylinder CD are illustrated in FIGS. 1-2B as defining cylindrical passageways therethrough, it will be understood that in alternate embodiments either or both of the ion mirrors M1, M2 and/or the charge detection cylinder CD may define non-cylindrical passageways therethrough such that one or more of the passageway(s) through which the longitudinal axis 20 centrally passes represents a cross-sectional area and profile that is not circular. In still other embodiments, regardless of the shape of the cross-sectional profiles, the cross-sectional areas of the passageway defined through the ion mirror M1 may be different from the passageway defined through the ion mirror M2.

Figure 3:
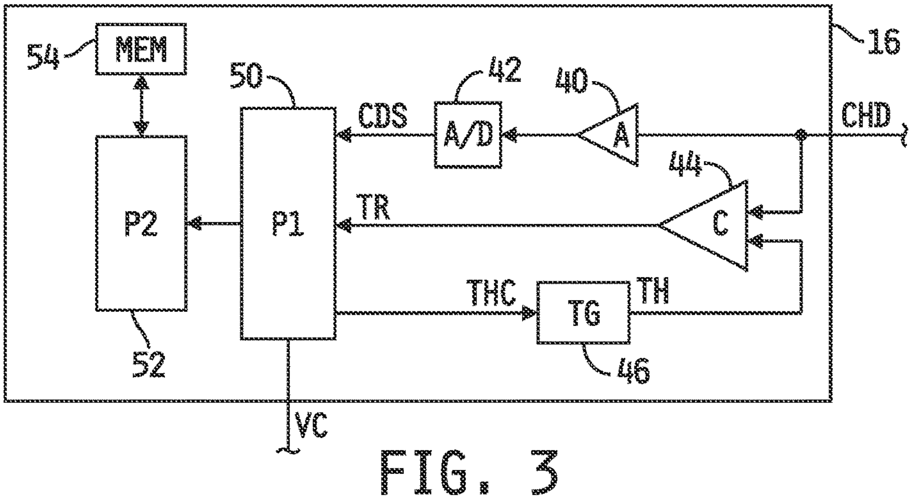
FIG. 3 is a simplified diagram of an embodiment of the processor illustrated in FIG. 1.

Referring now to FIG. 3, an embodiment is shown of the processor 16 illustrated in FIG. 1. In the illustrated embodiment, the processor 16 includes a conventional amplifier circuit 40 having an input receiving the charge detection signal CHD produced by the charge sensitive preamplifier CP and an output electrically connected to an input of a conventional Analog-to-Digital (A/D) converter 42. An output of the A/D converter 42 is electrically connected to a processor 50 (P1). The amplifier 40 is operable in a conventional manner to amplify the charge detection signal CHD produced by the charge sensitive preamplifier CP, and the A/D converter is, in turn, operable in a conventional manner to convert the amplified charge detection signal to a digital charge detection signal CDS.

The processor 16 illustrated in FIG. 3 further includes a conventional comparator 44 having a first input receiving the charge detection signal CHD produced by the charge sensitive preamplifier CP, a second input receiving a threshold voltage CTH produced by a threshold voltage generator (TG) 46 and an output electrically connected to the processor 50. The comparator 44 is operable in a conventional manner to produce a trigger signal TR at the output thereof which is dependent upon the magnitude of the charge detection signal CDH relative to the magnitude of the threshold voltage CTH. In one embodiment, for example, the comparator 44 is operable to produce an "inactive" trigger signal TR at or near a reference voltage, e.g., ground potential, as long as CHD is less than CTH, and is operable to produce an "active" TR signal at or near a supply voltage of the circuitry 40, 42, 44, 46, 50 or otherwise distinguishable from the inactive TR signal when CHD is at or exceeds CTH. In alternate embodiments, the comparator 44 may be operable to produce an "inactive" trigger signal TR at or near the supply voltage as long as CHD is less than CTH, and is operable to produce an "active" trigger signal TR at or near the reference potential when CHD is at or exceeds CTH. Those skilled in the art will recognize other differing trigger signal magnitudes and/or differing trigger signal polarities that may be used to establish the "inactive" and "active" states of the trigger signal TR so long as such differing trigger signal magnitudes and/or different trigger signal polarities are distinguishable by the processor 50, and it will be understood that any such other different trigger signal magnitudes and/or differing trigger signal polarities are intended to fall within the scope of this disclosure. In any case, the comparator 44 may additionally be designed in a conventional manner to include a desired amount of hysteresis to prevent rapid switching of the output between the reference and supply voltages.

The processor 50 is illustratively operable to produce a threshold voltage control signal THC and to supply THC to the threshold generator 46 to control operation thereof. In some embodiments, the processor 50 is programmed or programmable to control production of the threshold voltage control signal THC in a manner which controls the threshold voltage generator 46 to produce CTH with a desired magnitude and/or polarity. In other embodiments, a user may provide the processor 50 with instructions in real time, e.g., through a downstream processor, e.g., via a virtual control and visualization unit, to control production of the threshold voltage control signal THC in a manner which controls the threshold voltage generator 46 to produce CTH with a desired magnitude and/or polarity. In either case, the threshold voltage generator 46 is illustratively implemented, in some embodiments, in the form of a conventional controllable DC voltage source configured to be responsive to a digital form of the threshold control signal THC, e.g., in the form of a single serial digital signal or multiple parallel digital signals, to produce an analog threshold voltage CTH having a polarity and a magnitude defined by the digital threshold control signal THC. In some alternate embodiments, the threshold voltage generator 46 may be provided in the form of a conventional digital-to-analog (D/A) converter responsive to a serial or parallel digital threshold voltage TCH to produce an analog threshold voltage CTH having a magnitude, and in some embodiments a polarity, defined by the digital threshold control signals THC. In some such embodiments, the D/A converter may form part of the processor 50. Those skilled in the art will recognize other conventional circuits and techniques for selectively producing the threshold voltage CTH of desired magnitude and/or polarity in response to one or more digital and/or analog forms of the control signal THC, and it will be understood that any such other conventional circuits and/or techniques are intended to fall within the scope of this disclosure.

In addition to the foregoing functions performed by the processor 50, the processor 50 is further operable to control the voltage sources V1, V2 as described above with respect to FIGS. 2A, 2B to selectively establish ion transmission and reflection fields within the regions R1, R2 of the ion mirrors M1, M2 respectively. In some embodiments, the processor 50 is programmed or programmable to control the voltage sources V1, V2. In other embodiments, the voltage source(s) V1 and/or V2 may be programmed or otherwise controlled in real time by a user, e.g., through a downstream processor 52, e.g., via a virtual control and visualization unit. In either case, the processor 50 is, in one embodiment, illustratively provided in the form of a field programmable gate array (FPGA) programmed or otherwise instructed by a user to collect and store charge detection signals CDS for charge detection events and for ion measurement events, to produce the threshold control signal(s) TCH from which the magnitude and/or polarity of the threshold voltage CTH is determined or derived, and to control the voltage sources V1, V2. In this embodiment, the memory 18 described with respect to FIG. 1 is integrated into, and forms part of, the programming of the FPGA. In alternate embodiments, the processor 50 may be provided in the form of one or more conventional microprocessors or controllers and one or more accompanying memory units having instructions stored therein which, when executed by the one or more microprocessors or controllers, cause the one or more microprocessors or controllers to operate as just described. In other alternate embodiments, the processing circuit 50 may be implemented purely in the form of one or more conventional hardware circuits designed to operate as described above, or as a combination of one or more such hardware circuits and at least one microprocessor or controller operable to execute instructions stored in memory to operate as described above.

The embodiment of the processor 16 depicted in FIG. 3 further illustratively includes a second processor 52 coupled to the first processor 50 and also to at least one memory unit 54. In some embodiments, the processor 52 may include one or more peripheral devices, such as a display monitor, one or more input and/or output devices or the like, although in other embodiments the processor 52 may not include any such peripheral devices. In any case, the processor 52 is illustratively configured, i.e., programmed, to execute at least one process for analyzing ion measurement events. Data in the form of charge magnitude and charge timing data (i.e., detection of the timing of charges induced by the ion on the charge detection cylinder relative to one another) received by the processor 50 via the charge detection signals CDS is illustratively transferred from the processor 50 directly to the processor 52 for processing and analysis upon completion of each ion measurement event.

In some embodiments, the processor 52 is illustratively provided in the form of a high-speed server operable to perform both collection/storage and analysis of such data. In such embodiments, one or more high-speed memory units 54 may be coupled to the processor 52, and is/are operable to store data received and analyzed by the processor 52. In one embodiment, the one or more memory units 54 illustratively include at least one local memory unit for storing data being used or to be used by the processor 52, and at least one permanent storage memory unit for storing data long term. In one such embodiment, the processor 52 is illustratively provided in the form of a Linux® server (e.g., OpenSuse Leap 42.1) with four Intel® Xeon™ processors (e.g., E5-465L v2, 12 core, 2.4 GHz). In this embodiment, an improvement in the average analysis time of a single ion measurement event file of over 100× is realized as compared with a conventional Windows® PC (e.g., i5-2500K, 4 cores, 3.3 GHz). Likewise, the processor 52 of this embodiment together with high speed/high performance memory unit(s) 54 illustratively provide for an improvement of over 100× in data storage speed. Those skilled in the art will recognize one or more other high-speed data processing and analysis systems that may be implemented as the processor 52, and it will be understood that any such one or more other high-speed data processing and analysis systems are intended to fall within the scope of this disclosure. In alternate embodiments, the processor 52 may be provided in the form of one or more conventional microprocessors or controllers and one or more accompanying memory units having instructions stored therein which, when executed by the one or more microprocessors or controllers, cause the one or more microprocessors or controllers to operate as described herein.

In the illustrated embodiment, the memory unit 54 illustratively has instructions stored therein which are executable by the processor 52 to analyze ion measurement event data produced by the ELIT 14 to determine ion mass spectral information for a sample under analysis. In one embodiment, the processor 52 is operable to receive ion measurement event data from the processor 50 in the form of charge magnitude and charge detection timing information measured during each of multiple "charge detection events" (as this term is defined above) making up the "ion measurement event" (as this term is defined above), and to process such charge detection events making up such an ion measurement event to determine ion charge and mass-to-charge data, and to then determine ion mass data therefrom. Multiple ion measurement events may be processed in like manner to create mass spectral information for the sample under analysis.

Figure 4A:
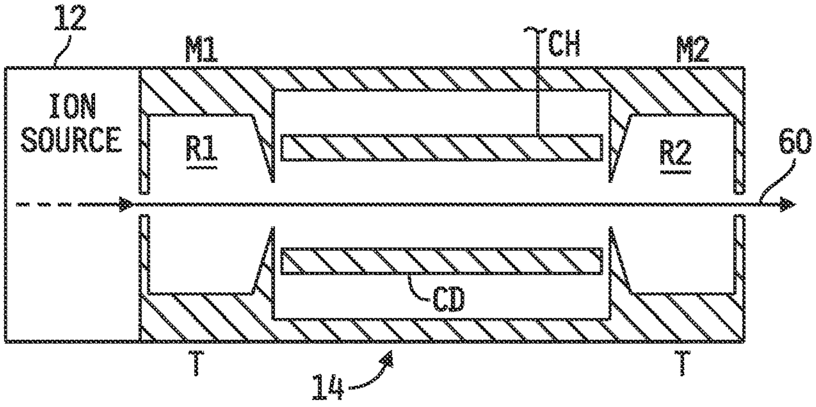
FIGS. 4A-4C are simplified diagrams of the ELIT of FIG. 1 demonstrating sequential control and operation of the ion mirrors to capture at least one ion within the ELIT and to cause the ion(s) to oscillate back and forth between the ion mirrors and through the charge detection cylinder to measure and record multiple charge detection events.
Figure 4B:
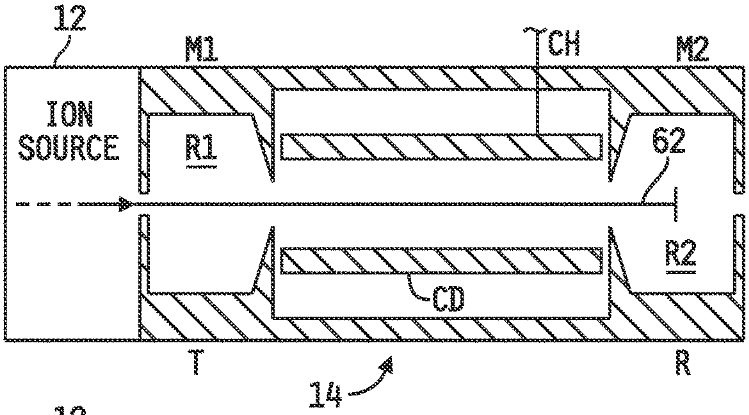
Figure 4C:
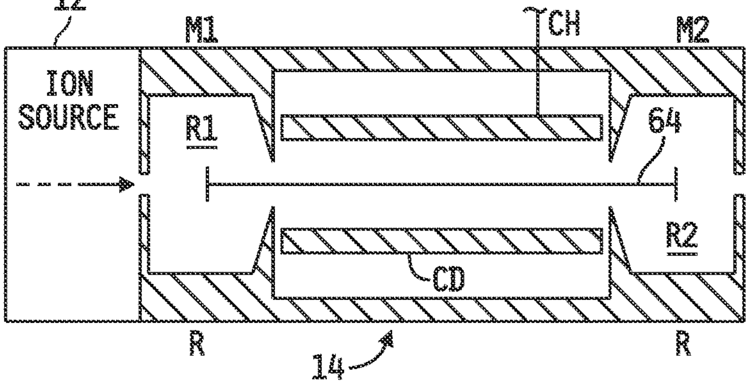

As briefly described above with respect to FIGS. 2A and 2B, the voltage sources V1, V2 are illustratively controlled by the processor 50, e.g., via the processor 52, in a manner which selectively establishes ion transmission and ion reflection electric fields in the region R1 of the ion mirror M1 and in the region R2 of the ion mirror M2 to guide ions introduced into the ELIT 14 from the ion source 12 through the ELIT 14, and to then cause a single ion to be selectively trapped and confined within the ELIT 14 such that the trapped ion repeatedly passes through the charge detector CD as it oscillates back and forth between M1 and M2. Referring to FIGS. 4A-4C, simplified diagrams of the ELIT 14 of FIG. 1 are shown depicting an example of such sequential control and operation of the ion mirrors M1, M2 of the ELIT 14. In the following example, the processor 52 will be described as controlling the operation of the voltage sources V1, V2 in accordance with its programming, although it will be understood that the operation of the voltage source V1 and/or the operation of the voltage source V2 may be virtually controlled, at least in part, by the processor 50.

As illustrated in FIG. 4A, the ELIT control sequence begins with the processor 52 controlling the voltage source V1 to control the ion mirror M1 to the ion transmission mode of operation (T) by establishing an ion transmission field within the region R1 of the ion mirror M1, and also controlling the voltage source V2 to control the ion mirror M2 to the ion transmission mode of operation (T) by likewise establishing an ion transmission field within the region R2 of the ion mirror M2. As a result, ions generated by the ion source 12 pass into the ion mirror M1 and are focused by the ion transmission field established in the region R1 toward the longitudinal axis 20 as they pass into the charge detection cylinder CD. The ions then pass through the charge detection cylinder CD and into the ion mirror M2 where the ion transmission field established within the region R2 of M2 focusses the ions toward the longitudinal axis 20 such that the ions pass through the exit aperture A1 of M2 as illustrated by the ion trajectory 60 depicted in FIG. 4A.

Referring now to FIG. 4B, after both of the ion mirrors M1, M2 have been operating in ion transmission operating mode for a selected time period and/or until successful ion transmission therethrough has been achieved, the processor 52 is illustratively operable to control the voltage source V2 to control the ion mirror M2 to the ion reflection mode (R) of operation by establishing an ion reflection field within the region R2 of the ion mirror M2, while maintaining the ion mirror M1 in the ion transmission mode (T) of operation as shown. As a result, at least one ion generated by the ion source 12 enters into the ion mirror M1 and is focused by the ion transmission field established in the region R1 toward the longitudinal axis 20 such that the at least one ion passes through the ion mirror M1 and into the charge detection cylinder CD as just described with respect to FIG. 4A. The ion(s) then pass(es) through the charge detection cylinder CD and into the ion mirror M2 where the ion reflection field established within the region R2 of M2 reflects the ion(s) to cause it/them to travel in the opposite direction and back into the charge detection cylinder CD, as illustrated by the ion trajectory 62 in FIG. 4B.

Referring now to FIG. 4C, after the ion reflection electric field has been established in the region R2 of the ion mirror M2, the processor 52 is operable to control the voltage source V1 to control the ion mirror M1 to the ion reflection mode (R) of operation by establishing an ion reflection field within the region R1 of the ion mirror M1, while maintaining the ion mirror M2 in the ion reflection mode (R) of operation in order to trap the ion(s) within the ELIT 14. In some embodiments, the processor 52 is illustratively operable, i.e., programmed, to control the ELIT 14 in a "random trapping mode" or "continuous trapping mode" in which the processor 52 is operable to control the ion mirror M1 to the reflection mode (R) of operation after the ELIT 14 has been operating in the state illustrated in FIG. 4B, i.e., with M1 in ion transmission mode and M2 in ion reflection mode, for a selected time period. Until the selected time period has elapsed, the ELIT 14 is controlled to operate in the state illustrated in FIG. 4B. In other embodiments, the processor 52 is operable, i.e., programmed, to control the ELIT 14 in a "trigger trapping mode" which illustratively carries a substantially greater probability of trapping a single ion therein as compared to the random trapping mode. In the "trigger trapping mode," the processor 52 is operable to control the ion mirror M1 to the reflection mode (R) of operation after an ion has been detected as passing through the charge detection cylinder CD.

In any case, with both of the ion mirrors M1, M2 controlled to the ion reflection operating mode (R) to trap an ion within the ELIT 14, the ion is caused by the opposing ion reflection fields established in the regions R1 and R2 of the ion mirrors M1 and M2 respectively to oscillate back and forth between the ion mirrors M1 and M2, each time passing through the charge detection cylinder CD as illustrated by the ion trajectory 64 depicted in FIG. 4C and as described above. In one embodiment, the processor 50 is operable to maintain the operating state illustrated in FIG. 4C until the ion passes through the charge detection cylinder CD a selected number of times. In an alternate embodiment, the processor 50 is operable to maintain the operating state illustrated in FIG. 4C for a selected time period after controlling M1 (and M2 in some embodiments) to the ion reflection mode (R) of operation. In either embodiment, the number of cycles or time spent in the state illustrated in FIG. 4C may illustratively be programmed, e.g., via instructions stored in the memory 54, or controlled via a user interface, and in any case the ion detection event information resulting from each pass by the ion through the charge detection cylinder CD is temporarily stored in the processor 50, e.g., in the form of an ion measurement file which may illustratively have a predefined data or sample length. When the ion has passed through the charge detection cylinder CD a selected number of times or has oscillated back-and-forth between the ion mirrors M1, M2 for a selected period of time, the total number of charge detection events stored in the processor 50 defines an ion measurement event and, upon completion of the ion measurement event, the stored ion detection events defining the ion measurement event, e.g., the ion measurement event file, is passed to, or retrieved by, the processor 52. The sequence illustrated in FIGS. 4A-4C then returns to that illustrated in FIG. 4A where the voltage sources V1, V2 are controlled as described above to control the ion mirrors M1, M2 respectively to the ion transmission mode (T) of operation by establishing ion transmission fields within the regions R1, R2 of the ion mirrors M1, M2 respectively. The illustrated sequence then repeats for as many times as desired.

Heretofore, ion measurement event files were analyzed in the frequency domain using a Fast Fourier Transform (FFT) algorithm. In such implementations, the mass-to-charge ratio (m/z) of the ion was calculated from the fundamental oscillation frequency (f0) of the signal using a calibration constant (C) (Equation 1), and the charge of the ion was determined by the magnitude of the fundamental frequency peak in the FFT.

$$\frac{m}{Z} = \frac{C}{f_0^2} \qquad \text{Equation 1}$$

Since only the fundamental frequency was used in determining the ion charge, the signal can be thought of as being expressed as only a single sine wave. However, a significant amount of information about the signal is unused by the FFT because higher order harmonics are disregarded. This means the signal must be measured for longer to obtain charge-state resolution. Expressing the waveform more completely would decrease the amplitude uncertainty, therefore improving the charge precision and reducing the trapping time that is necessary to reach charge-state resolution. Moreover, while the peak magnitude in FFT analysis depends on factors like the signal duty cycle, the time domain signal amplitude is constant for a given charge and the amplitude measurement in the time domain is independent of the duty cycle. These characteristics make time domain analysis advantageous for applications with time-variant signal transients such as those found in CDMS where the ion oscillation frequency and the signal duty cycle change as the ion loses energy by collisions with the background gas and electrostatic interactions with the detection cylinder.

The following describes a process for analyzing the signal measurements contained in the ion measurement event files in the time domain in conjunction with the FFT that incorporates information contained within higher order harmonics by fitting the signal measurements to a simulated waveform to more precisely measure the ion charge. In the following description, the ELIT is designed such that the time-domain charge detection signals CHD stored in the ion measurement event files are square-wave signals (i.e., with 50% duty cycle), although it will be understood that in alternate implementations the ELIT may be designed such that the duty cycle of the time-domain charge detection signals CHD is greater or less than 50%. With 50% duty cycle signal measurements contained in the ion measurement files, the following algorithm improves the charge magnitude determination precision by 15% to 20% compared to the FFT, reaching the statistical lower limit for amplitude uncertainty for a square wave corrupted with Gaussian noise. The best charge standard deviation that can be achieved for a square wave is related to the standard deviation of the noise ($\sigma_{noise}$) and the number of points the waveform spends in the HI state compared to the points spent in the LO state ($N_{HI}$ and $N_{LO}$, respectively) with the following relationship:

$$\sigma_{best} = \sqrt{\left(\frac{\sigma_{noise}}{N_{HI}}\right)^2 + \left(\frac{\sigma_{noise}}{N_{LO}}\right)^2} \qquad \text{Equation 2}$$

Figure 5:
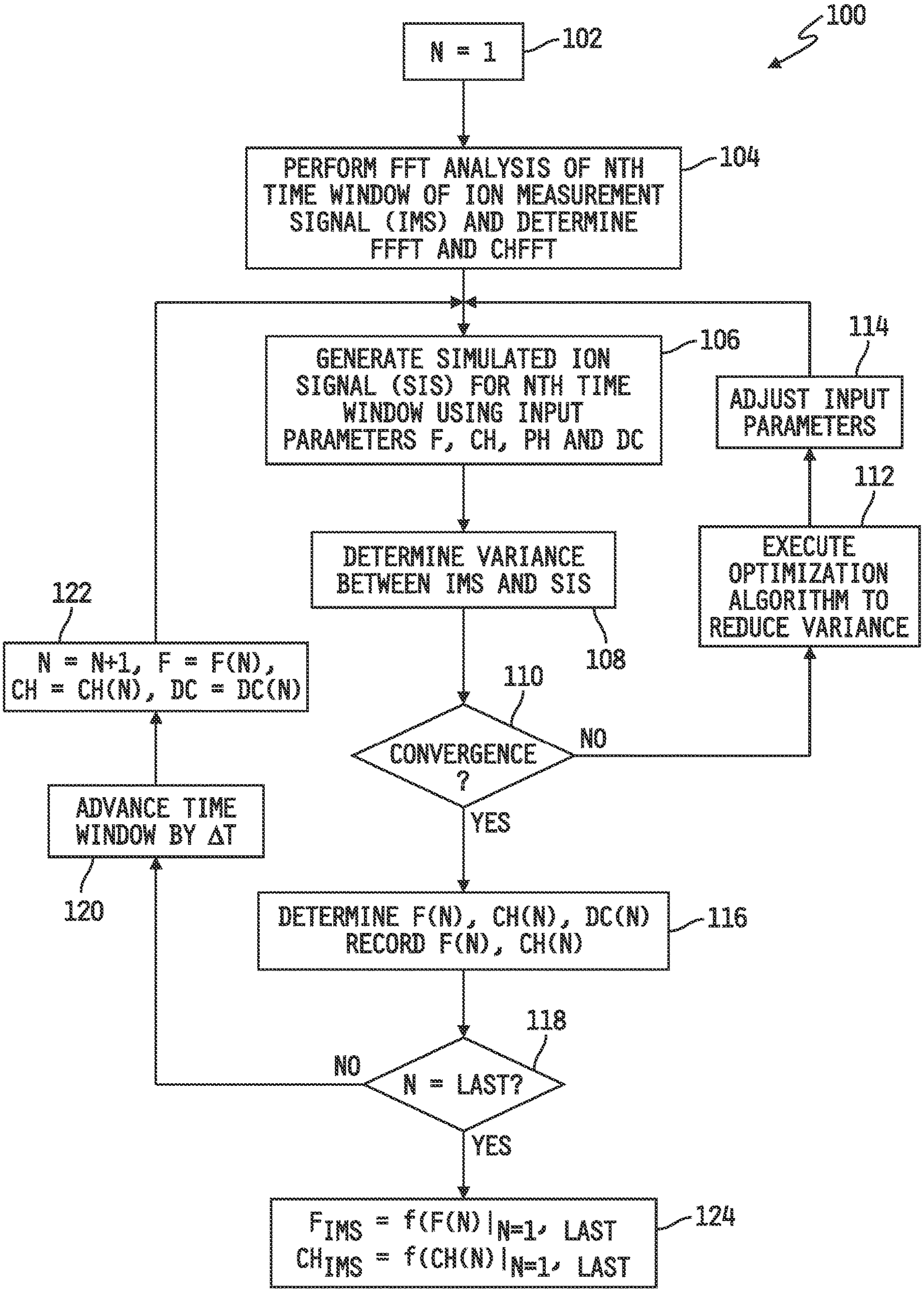
FIG. 5 is a simplified flow diagram depicting an embodiment of a process for analyzing the signal measurements contained in an ion measurement event file in the time domain to determine the frequency and the charge magnitude (z) of the ion oscillating back and forth through the charge detection cylinder of the ELIT during an ion trapping event.

Referring now to FIG. 5, a simplified flow diagram is shown of an embodiment of a process 100 for analyzing the signal measurements contained in an ion measurement event file in the time domain to determine the frequency and the charge magnitude (z) of the ion oscillating back and forth through the charge detection cylinder of the ELIT during an ion trapping event. From this frequency determination, the mass-to-charge ratio (m/z) of the ion is determined from equation 1, and the mass of the ion is determined as a product of m/z and z. Illustratively, the process 100 is stored in the memory of the processor 16 in the form of instructions executable by the processor 16 to carry out the functionality of the process 100.

The process 100 begins at step 102 where a time window counter, N, is initialized to 1 (or some other constant value). The process 100 is illustratively designed to analyze the signal measurements contained in an ion measurement event file by analyzing signal measurements in each of a plurality of sequential time windows of the measurement event file. This file windowing approach advantageously reduces the effect of a time-varying frequency and duty cycle on the measured amplitudes as long as the frequency and duty cycle of the signal measurements do not substantially change in each time window, thereby allowing for an approximation of these parameters to be constant for the duration of each window. In one example implementation in which the ion measurement event file is approximately 100 ms in length and contains approximately 1,000 cycles of signal measurements, the time windows are illustratively selected to each be 10 ms in length with each of the 10 time windows contain 100 cycles of signal measurements.

Following step 102, the process 100 advances to step 104 where the processor 16 is operable to perform an FFT analysis of the $1^{st}$ time window of the signal measurements contained in an ion measurement event file (hereinafter ion measurement signal IMS), and to determine the fundamental oscillation frequency ($F_{FFT}$) and the charge magnitude ($CH_{FFT}$) of the $1^{st}$ time window of the IMS signal in a conventional manner as described above. In one example implementation, $CH_{FFT}$ is multiplied by 2.955 ADC bits/e to obtain the time domain signal amplitude in ADC bits for later use in the process 100.

Following step 104, the process 100 advances to step 106 where the processor 16 is operable to generate a simulated ion signal (SIS) for the Nth time window using input parameters F, CH, PH and DC, where F is frequency, CH is charge magnitude, PH is phase and DC is duty cycle.

Figure 6:
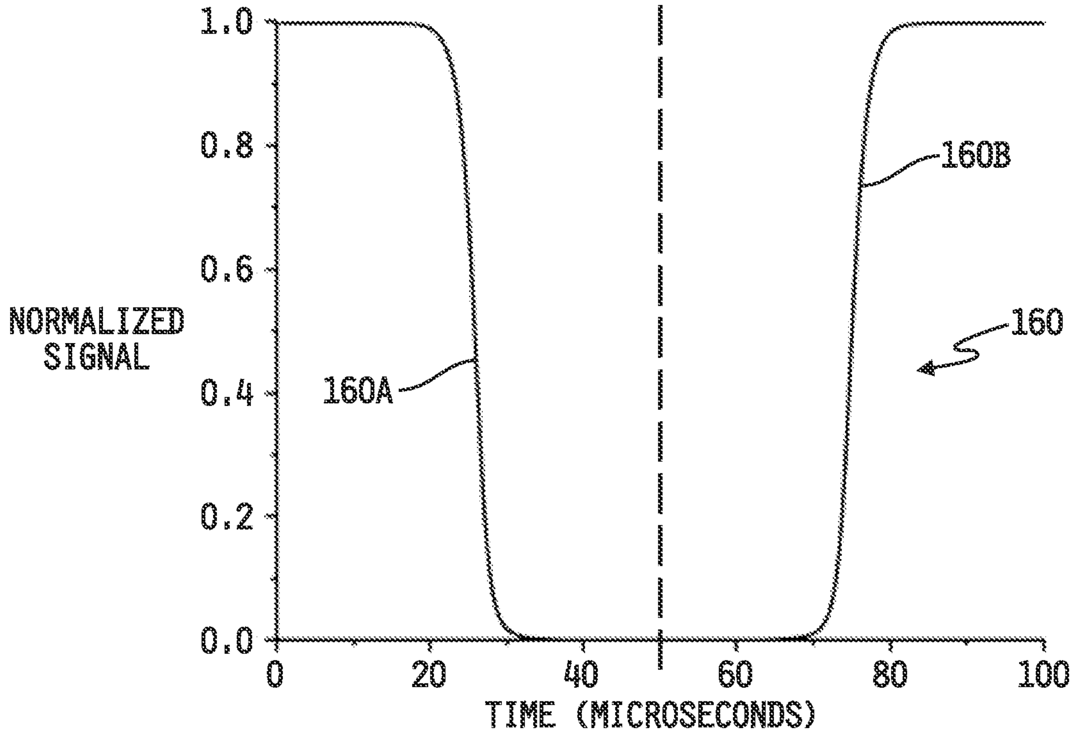
FIG. 6 is a plot of signal vs. time depicting one period of a simulated signal for an axial ion trajectory in an electrostatic linear ion trap.
Figure 7:
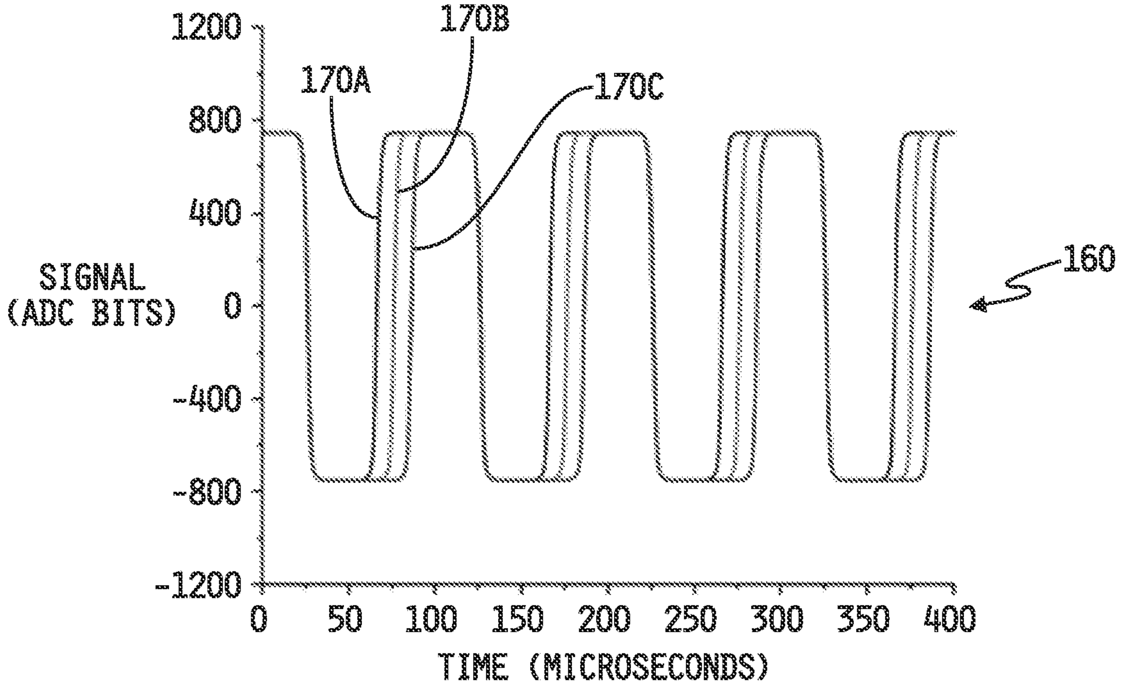
FIG. 7 is an expanded plot of the simulated signal of FIG. 6 in which the duty cycle is varied between 40% and 60%.

In one example implementation, SIS was generated by simulating in the ELIT a trajectory of one 130 eV/z ion with an m/z of 25,600 TH using a Beeman algorithm (a modified Velocity Verlet algorithm) in Fortran at 10.02306 kHz using electric fields calculated by SIMION 8.1. The signal for that ion was generated by superimposing the ion trajectory over a potential array where the charge detection cylinder has +1 and all other electrodes are held at ground. This generates a signal 160 that is normalized to +1 in accordance with Green's Reciprocity Theorem as depicted by example in FIG. 6. The signal 160 is broken up into two sections; 1 negative-going transition 160A and a positive-going transition 160B. One period of the signal was fit using two bi-dose sigmoidal curves in OriginPro 2018. One curve was used for the positive-going transition 160B (for when an ion enters the detection cylinder), and a separate curve was used for the negative-going transition 160A (for when an ion exits the cylinder) according to the following equation, $$s_1(t) = \frac{p}{1 + 10^{\left((I_1 + \Delta DC) - f_{scaling}\left(t - t_0 + T\right)\right) * h_1 h_{scaling}}} \qquad \text{Equation 3}$$

$$s_2(t) = \frac{1 - p}{1 + 10^{\left((I_2 + \Delta DC) - f_{scaling}\left(t - t_0 + T\right)\right) * h_2 h_{scaling}}}$$

$$SIS(t) = A(s_1(t) + s_2(t))$$

where t is time, p is a general fitting parameter for a sigmoidal curve, and $I_1$, and $I_2$ describe the time at which the SIS waveform 160 rises or falls. These values were additively adjusted by ADC to change the duty cycle of the positive-going transition while the negative-going transition is left constant as depicted by example in FIG. 7 in which the duty cycle of the generated waveform 160 is varied from 40% (trace 170A) to 60% (trace 170C) with the nominal 50% duty cycle (trace 1708) shown for comparison.

Figure 8:
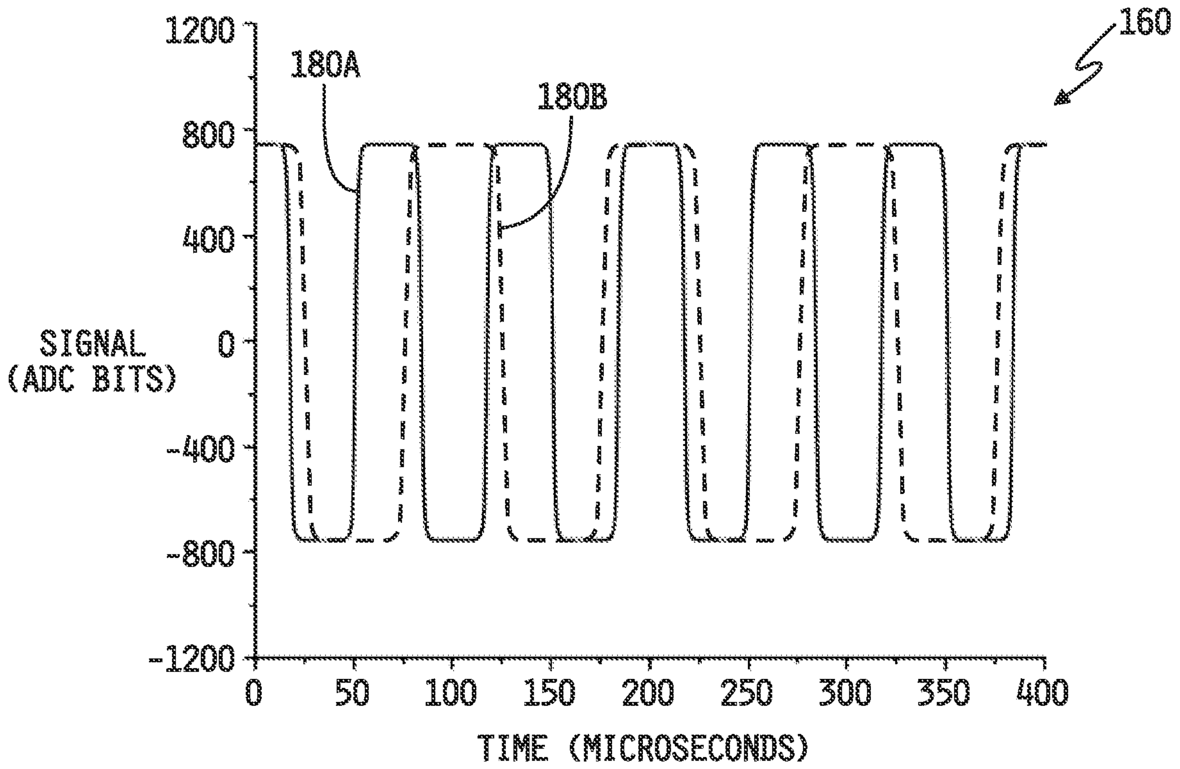
FIG. 8 is another expanded plot of the simulated signal of FIG. 6 in which the frequency is varied between 10 kHz and 15 kHz.

In equation 3, $f_{scaling}$ is the desired frequency divided by the nominal frequency used in initially creating an analytical function for this waveform (e.g., 10.02306 kHz). An example such analytical function is illustrated in FIG. 8 in which the signal 160 is variable between a lower frequency 180A, e.g., 10 kHz, and a higher frequency 180B, e.g., 15 kHz. T is the wave period duration, the time that has elapsed since the last wave period has begun is $t - t_0$ and A is the amplitude. Phase is adjusted by adding a phase time to $t_0$ which shifts the waveform by a specified time. The variables $h_1$ and $h_2$ describe the rate at which a wave transitions between LO to HI or HI to LO states. Smaller h values produce a more rounded waveform while higher h values generate a waveform with steeper transitions. The variable $h_{scaling}$ multiplicatively adjusts h to adjust the transition slope. The minima and maxima for these curves were constrained to 0 and +1, respectively so they could be concatenated end-to-end to generate a periodic waveform. The SIS waveform was then scaled to an amplitude of 1500 ADC bits and centered around zero.

Figure 9:
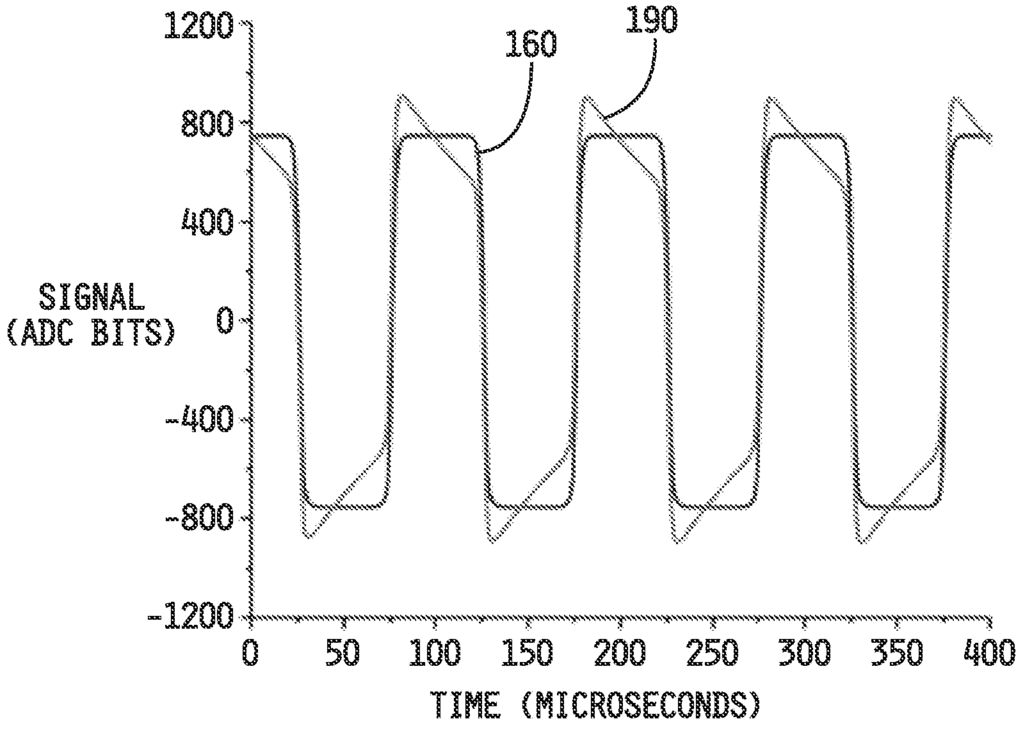
FIG. 9 is an expanded plot of the simulated signal of FIG. 6 shown with a modified variation superimposed thereon, wherein the modified variation introduces RC decay.

A discrete-time first-order recurrence relation implementation of a high pass filter ($\tau$=7.89320623×$10^{-5}$ s) was applied to the SIS waveform 160 to apply an RC decay 190 noted on an existing mass spectrometer, as depicted by example in FIG. 9. A decay constant multiplied by the symmetric numerical derivative of the waveform generated the RC-decayed point i of the SIS waveform function in accordance with the following equation.

$$SIS_i = \frac{\tau}{r - \Delta t}\left(\frac{SIS_{i+1} - SIS_{1-1}}{2}\right) \quad \text{Equation 4}$$

The $\tau$ constant was determined by applying a square wave produced by a function generator to an antenna in proximity to the charge detection cylinder on the spectrometer and fitting a square wave in the time domain with different RC values to find the value that gave the best fit. The variable $\Delta t$ represents the time of a single ADC sample (400 ns).

Figure 10:
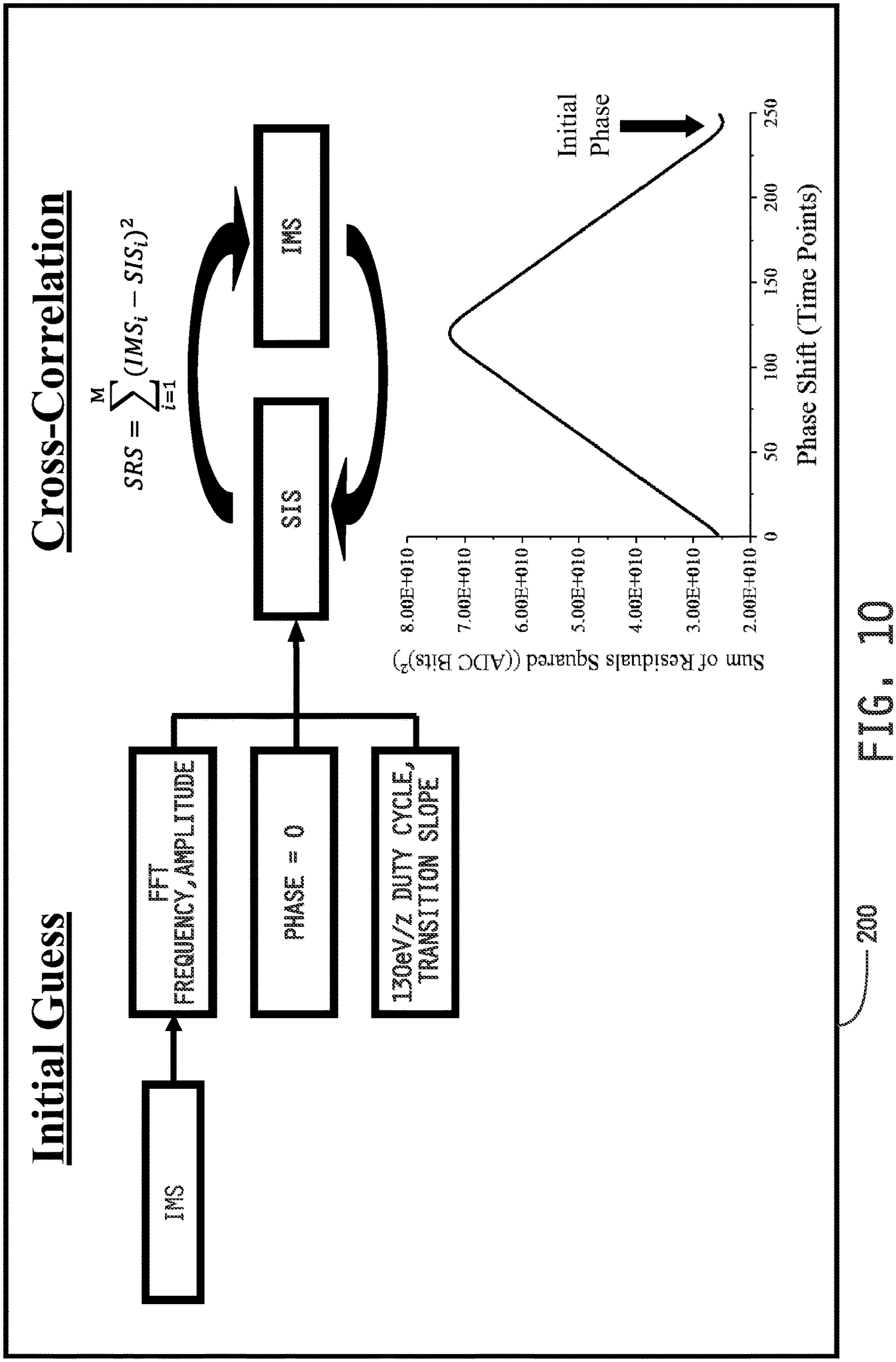
FIG. 10 is a simplified work flow diagram illustrating an embodiment of a cross-correlation process for determining an initial estimate of the phase of the simulated ion signal.

Referring again to step 106 of the process 100 of FIG. 5, for the first pass of the first time window (N=1) of simulated ion signal SIS, $F=F_{FFT}$, $CH=CH_{FFT}$, PH=zero and an estimate of DC=49.2% corresponding to the duty cycle for an ion traveling an axial trajectory at 130 eV/z. A cross-correlation is further illustratively performed at step 106 between the first time windows of IMS and SIS as depicted by example in the process 200 illustrated in FIG. 10. In this process 200, the initial SIS (with PH=0) is cross-correlated with IMS by shifting SIS over by one sampling point (e.g., 400 ns) and then calculating a variance, e.g., using a conventional sum of residual squares (SRS), between IMS and SIS at each phase. The minimum of the resulting correlation function (where the IMS and SIS phases match to the nearest acquisition point) then illustratively serves as an initial, non-zero estimate for the phase of the PH in the SIS signal.

With the simulated ion signal (SIS) generated and populated within initial input parameter values as just described, the process 100 advances from step 106 to step 108 where the processor 16 is operable to determine a variance between IMS and SIS. In one embodiment, the signal variance is determined using a conventional sum of residual squares (SRS) according to the following equation where, in one implementation, M=25,000 acquisition points (the number of points in a 10 ms window of an IMS file), although in alternate implementations M may be any positive integer.

$$SRS = \sum_{i=1}^{M} (IMS_i - SIS_i)^2 \quad \text{Equation 5}$$

In alternate embodiments, other conventional variance-determining equations and/or process may be used.

In any case, following step 108, the process 100 advances to step 110 where the processor 16 is operable to determine whether the variance process executed at step 108 has converged. Illustratively, convergence at step 110 is carried out by comparing the results of equation 5 to the results of the previous execution of equation 5. On the first execution of step 110, there will be only a single execution of equation 5 so the process 100 follows the NO branch of step 110 to step 112 where the processor 16 is operable to execute an optimization algorithm configured to reduce the variance between IMS and SIS.

The variance determined at step 108 between IMS and SIS for each combination of input parameters illustratively produces a cost function that can be minimized at step 112 using any of a variety of conventional optimization algorithms. In one example implementation, a conventional gradient descent method is illustratively used as the optimization algorithm. This particular optimization method is advantageous in the present context because significant throughput improvements can be realized by employing fast first-order approximation algorithms. This makes it possible to accelerate this analysis method to keep up with real-time data acquisition without substantial increases in computational expense. In alternate embodiments, one or more other conventional optimization algorithms may be used.

In the gradient descent optimization, the IMS and SIS are compared by calculating the SRS between them for a particular set of input parameters. The input parameters are then varied by a relatively small amount to determine the numerical partial derivative of SRS with respect to each of the input parameters. Following the partial derivative calculation, the input parameters are adjusted at step 114 by their respective partial derivatives multiplied by unique learning rates ($\gamma$) for each input parameter based on their individual rates of convergence. If $X_n$ is the vector of parameters at iteration n and $\gamma$ is the vector of learning rates, then the gradient descent equation for step n+1 can be written as follows (Equation 6). Here F, DC, PH, CH, and S represent the frequency, duty cycle, phase, amplitude, and transition slope parameters, respectively, used in the synthesis of a noiseless waveform.

$$\nabla SRS = \frac{\partial SRS}{\partial F}\hat{i} + \frac{\partial SRS}{\partial DC}\hat{j} + \frac{\partial SR}{\partial PH}\hat{k} + \frac{\partial SRS}{\partial CH}\hat{l} + \frac{\partial SRS}{\partial S}\hat{m} \quad \text{Equation 6}$$

$$X = \begin{bmatrix} F \\ DC \\ PH \\ CH \\ S \end{bmatrix} \quad \gamma = \begin{bmatrix} \gamma_F \\ \gamma_{DC} \\ \gamma_{PH} \\ \gamma_{CH} \\ \gamma_S \end{bmatrix}$$

$$X_{n+1} = X_n - \gamma \nabla SRS(X_n)$$

Figure 11:
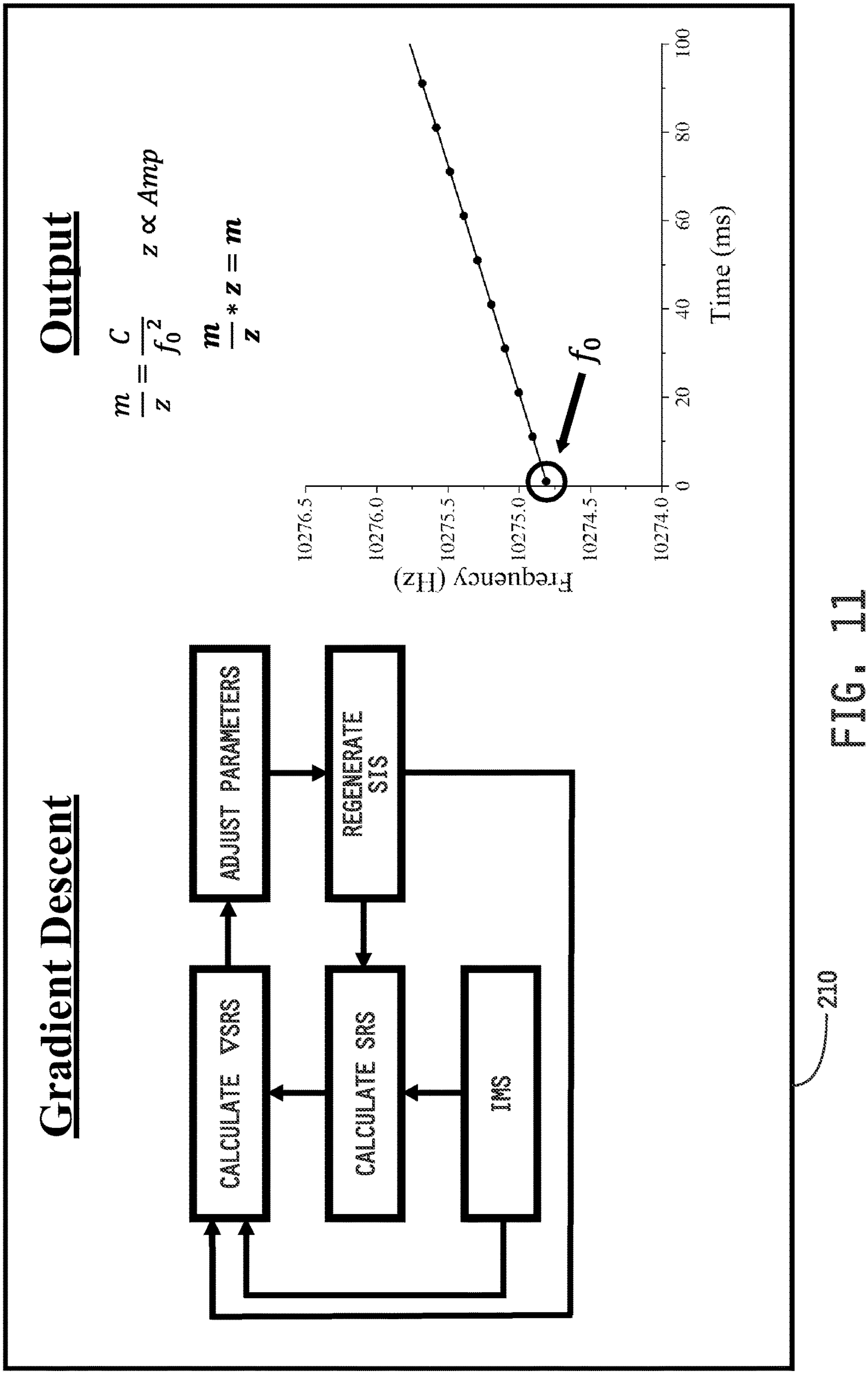
FIG. 11 is a simplified work flow diagram illustrating an embodiment of an optimization algorithm for reducing variance between a simulated ion signal and an ion measurement signal.

It should be noted that the transition slope, S, is not applicable with square waves as transitions are instantaneous, and the transition slop omitted in such cases as in the process illustrated in FIG. 5. In any case, using the adjusted parameters resulting from execution of step 114, the process loops back to step 106 where the processor 16 is operable to generate a new simulated ion signal (SIS). This iterative process of steps 106-114, also depicted in alternate form by the process 210 illustrated in FIG. 11, is continued until the processor 16 determines at step 110 that a convergence limit is reached. In one embodiment, this convergence limit is set by the ratio of the SRS at a current iteration ($SRS_n$) and the SRS ($SRS_{n-1}$) at the previous iteration. If $SRS_n/SRS_{n-1}$ is sufficiently close to unity, e.g., between 0.99999999 and 1, for more than a predetermined number, e.g., 50, of iterations, the processor 16 is operable to determine that the fit has converged. An example of a portion of a best-fit waveform 240 at convergence is illustrated in FIG. 13 superimposed over an IMS signal 230 that has been corrupted by noise.

Following the YES branch of step 110, the process 100 advances to step 116 where the processor is operable to determine the frequency F(N), the charge magnitude CH(N) and the duty cycle DC(N) of the Nth time window of IMS fitted to SMS. The frequency, F(N), of the Nth time window of the ion measurement signal IMS is illustratively computed directly from the time-based transitions of the signal cycles (e.g., approximately 100 cycles in the example implementation described above). The charge magnitude, CH(N), of the Nth time window of the ion measurement signal IMS is illustratively computed as an average of the amplitudes of the cycles making up the Nth time window, and DC(N) is the most recent value of DC at convergence.

Figure 12:
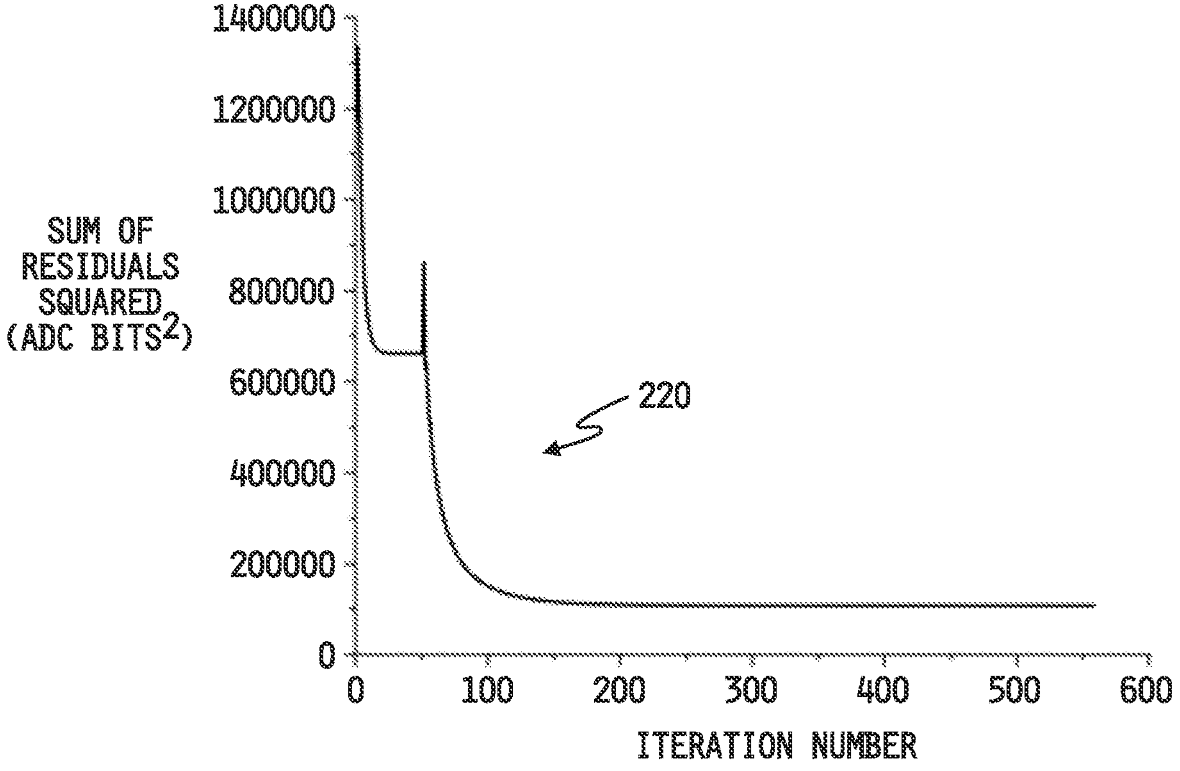
FIG. 12 is plot of SRS vs. iteration number illustrating an example convergence according to the optimization algorithm of FIG. 11.

Following step 116, the process 100 advances to step 118 where the processor 16 is operable to determine whether the last time window of the ion measurement signals IMS has been processed. If not, the process 100 advances to step 120 where the processor 16 is operable to advance the time window by a duration ΔT, e.g., 10 ms. Thereafter at step 122, the processor 16 is operable to increment the time window counter N by 1, and to set initial values for the input parameters F, CH and DC. After the first time window (N=1) has been analyzed, the initial guess for the subsequent window consists of the best-fit frequency, duty cycle, and charge amplitude of the previous window. For each window N≥2, the first 50 iterations of the iterative process of steps 106-114 are illustratively reserved for finding the phase, PH, for the next window and then subsequent iterations optimize all parameters until convergence has been reached. This is illustrated graphically in FIG. 12 as a plot of SRS vs. iteration number in which the waveform 220 show the first 50 iterations being relatively flat as the phase, PH, is found, after which the waveform 220 moves toward convergence.

If, at step 116, the processor 16 determines that the last time window of IMS has been processed, the process 100 advances to step 124 where the frequency values F(N) of the plurality of time windows are processed by the processor 16 to determine the fundamental frequency $F_{IMS}$ of the ion measurement signal. In some embodiments, measurements of the ion oscillations within the ELIT are not recorded immediately in order to allow transients, resulting from switching voltages on the ion mirrors M1, M2, to subside. Thereafter, the ion typically loses energy as it oscillates back and forth between the ion mirrors M1, M2 due to collisions with the background gas and electrostatic interactions with the charge detection cylinder. Such loss of energy results in an increase in frequency as the ion continues oscillating back and forth between the ion mirrors M1, M2 as depicted graphically in FIG. 11. In such embodiments, the fundamental frequency $F_{IMS}$ is illustratively determined by fitting a line to the frequencies F(N) of all of the time windows as a function of time and then extrapolating to the beginning of the trapping event to determine $F_{IMS}$ before the ion lost any energy, which is also shown graphically in FIG. 11 with the fundamental frequency $F_{IMS}$ depicted as $f_0$. The mass-to-charge ratio of the ion is then computed using $F_{IMS}$ with equation 1. In other embodiments with shorter trapping times and/or improved ELIT structures, ions may not lose appreciable energy during a trapping event, and in such embodiments the fundamental frequency $F_{IMS}$ may be computed as an average of F(N) over the N windows.

The processor 16 is further operable at step 124 to process the charge magnitude values CH(N) of the plurality of time windows to determine the charge magnitude $CH_{IMS}$ of the ion. Since the charge is constant across the IMS file, the charge $CH_{IMS}$ is illustratively determined by averaging the charge magnitude values CH(N) across all N windows.

EXAMPLE

FFT analysis of 1000 files containing a square wave signal corrupted with 1000 ADC bits RMSD of Gaussian noise with a duration of 100 ms resulted in a charge RMSD of 1.65 elementary charges (e). Time domain analysis of the same files, using the techniques described herein, resulted in an RMSD of 1.35e. In addition, the amplitude reported by the time domain analysis is not dependent on the RC decay, increasing the signal-to-noise ratio by 1%. In total, this represents a 19% improvement in charge precision compared to the FFT. The theoretical best charge RMSD was achieved for the 50% duty cycle square wave with time domain analysis (per Equation 1: $\sigma_{noise}$=1000 ADC bit, $N_{HI}$=$N_{LO}$=125,000 points at a 50% duty cycle, $\sigma_{best}$=4 ADC bits or 1.35 elementary charges). An identical analysis was performed for files containing simulated ion signal corrupted with 1000 ADC bits RMSD of Gaussian noise and resulted in an RMSD of 1.65e for the FFT analysis and 1.45e RMSD for time domain analysis, representing a 13% improvement in charge precision.

The decreased improvement in charge precision for the simulated ion signal compared to the square wave can be understood by examining the Hessian matrix of second order partial derivatives for each of the parameters being fit by this algorithm.

Equation 7

$$HSRS = \begin{bmatrix} \frac{\partial^2 SRS}{\partial F^2} & \frac{\partial^2 SRS}{\partial F \partial DC} & \frac{\partial^2 SRS}{\partial F \partial PH} & \frac{\partial^2 SRS}{\partial F \partial CH} & \frac{\partial\partial^2 SRS}{\partial F \partial S} \\ \frac{\partial^2 SRS}{\partial DC \partial F} & \frac{\partial^2 SRS}{\partial DC^2} & \frac{\partial^2 SRS}{\partial DC \partial PH} & \frac{\partial^2 SRS}{\partial DC \partial CH} & \frac{\partial^2 SRS}{\partial DC \partial S} \\ \frac{\partial^2 SRS}{\partial PH \partial F} & \frac{\partial^2 SRS}{\partial PH \partial DC} & \frac{\partial^2 SRS}{\partial \varphi^2} & \frac{\partial^2 SRS}{\partial PH \partial CH} & \frac{\partial^2 SRS}{\partial PH \partial S} \\ \frac{\partial^2 SRS}{\partial CH \partial F} & \frac{\partial^2 SRS}{\partial CH \partial DC} & \frac{\partial^2 SRS}{\partial CH \partial PH} & \frac{\partial^2 SRS}{\partial CH^2} & \frac{\partial^2 SRS}{\partial CH \partial S} \\ \frac{\partial^2 SRS}{\partial S \partial F} & \frac{\partial^2 SRS}{\partial S \partial DC} & \frac{\partial^2 SRS}{\partial S \partial PH} & \frac{\partial^2 SRS}{\partial S \partial CH} & \frac{\partial^2 SRS}{\partial S^2} \end{bmatrix}$$

If the Hessian matrix is diagonally dominated, then the optimization problem becomes well-posed where there is a clear global minimum and uncertainties from each of the parameters do not couple to each other. In this situation, the parameters are linearly independent and first-order gradient descent algorithms can quickly solve these problems. This is realized in a square wave signal where the transitions between HI and LO states of the signal are instantaneous (at least within the temporal resolution offered by a 2.5 MHz sampling frequency). This means the height of each transition and the time at which they occur is independent of parameters such as the amplitude, frequency, duty cycle, and phase of the signal. On the other hand, the Hessian matrix for an ion signal that has gradual transitions between HI and LO states is not diagonally dominated and has significant contributions from the mixed partial derivatives which link the parameters and their respective uncertainties to each other. This means the rise and fall times of the transitions become a function of the frequency which couples the uncertainty in the frequency to the uncertainty in all other parameters (i.e. not knowing when a transition occurs means the duty cycle cannot be confidently assigned, which is compensated by an incorrect amplitude measurement). A unique solution does not exist for these ill-posed optimization problems and it is difficult to converge towards the cost function minimum when the signal is obscured by noise. Parameter interdependence may be minimized by designing a detection system that generates signals with sharp transitions between the LO and HI states. For example, this could be accomplished by minimizing the detection cylinder inner diameter so the ion signal has rapid rise and fall times.

In alternate embodiments, the ion signal best-fit bi-dose sigmoidal equations may be modified to fit to signals generated by mass spectrometers to account for signal shape distortions arising from geometric imperfections and/or other design features of the ELIT. The more accurately the actual instrument ion signal is known, the more precisely the waveform synthesis function can be applied to fitting the instrument signal. While any function can be used in the waveform synthesis subroutine to fit any signal, it should be noted that the theoretical precision of the parameters will depend on the waveform characteristics. Finally, faster optimization algorithms or algorithms more suitable for nonlinear optimization problems such as the simplex optimizer can be employed to fit the noiseless waveform to a signal. In addition, a significant throughput improvement can be realized by designing a system that generates signal which can be fit with fast first-order gradient descent algorithms with momentum such as AMS Grad. Alternatively, the number of steps needed to reach convergence can be minimized by employing second-order optimization schemes such as Newton's Method. With these improvements, it is possible to perform time domain analysis on files in conjunction with real-time FFT analysis.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. For example, it will be understood that the ELIT 14 illustrated in the attached figures and described herein is provided only by way of example, and that the concepts, structures and techniques described above may be implemented directly in ELITs of various alternate designs. Any such alternate ELIT design may, for example, include any one or combination of two or more ELIT regions, more, fewer and/or differently-shaped ion mirror electrodes, more or fewer voltage sources, more or fewer DC or time-varying signals produced by one or more of the voltage sources, one or more ion mirrors defining additional electric field regions, or the like. As another example, in some alternate embodiments the process illustrated in FIG. 5 may be used only to determine the charge magnitude, $CH_{IMS}$ (i.e., z), of an ion in a trapping event, and the conventional FFT approach described above may be used to determine the mass-to-charge ratio (m/z). As yet another example, the process illustrated in FIG. 5 may be modified to take into account possible variances in the frequency measurements within one or more of the time windows and/or the entire ion measurement file may be processed in a manner which takes into account any such possible variances in the frequency measurements.

What is claimed is:

1. A method for measuring a charge of an ion in an electrostatic linear ion trap including a charge detection cylinder positioned between two ion mirrors, in which during an ion trapping event the ion repeatedly oscillates back and forth between the two ion mirrors each time passing through and inducing a corresponding charge on the charge detection cylinder and in which an ion measurement signal including magnitudes of the induced charges and timing of the induced charges during the trapping event are recorded in an ion measurement file, the method comprising:

(a) establishing a time window of the ion measurement signal at the beginning of the ion measurement file, (b) generating a simulated ion measurement signal for the time window of the ion measurement signal using input parameters including estimates of signal frequency, charge magnitude, signal phase and duty cycle, (c) iteratively processing a variance between the time window of the ion measurement signal and the simulated ion measurement signal by adjusting values of the input parameters until the variance reaches convergence, (d) recording a charge magnitude value resulting from (c), (e) advancing the time window of the ion measurement signal by an incremental time amount, (f) repeating (b)-(d) until the time window reaches the end of the ion measurement file, and (g) determining the charge of the ion based on the charge magnitude values of each of the time windows.

2. The method of claim 1, wherein (b) comprises processing the time window of the ion measurement signal to determine the estimates of signal frequency and charge magnitude.

3. The method of claim 2, wherein processing the time window of the ion measurement signal comprises computing a Fast Fourier Transform (FFT) of the time window of the ion measurement signal and determining the estimates of signal frequency and charge magnitude based on the (FFT).

4. The method of claim 1, wherein, for a first execution of (b) for the time window of the ion measurement signal at the beginning of the ion measurement file, an initial estimate of the signal phase is set to zero, and wherein (b) further comprises cross-correlating the simulated ion measurement signal with the time window of the ion measurement signal, and updating the estimate of the signal phase to a minimum value resulting from the cross-correlation.

5. The method of claim 1, wherein (c) comprises:

(1) determining a variance between the time window of the ion measurement signal and the simulated ion measurement signal, (2) executing an optimization process to reduce the variance between the time window of the ion measurement signal and the simulated ion measurement signal, and (3) adjusting values of the input parameters based on a result of the optimization process.

6. The method of claim 5, wherein (c) further comprises recording the adjusted charge magnitude value upon convergence of the variance, and wherein (g) comprises determining the charge magnitude of the ion based on the adjusted charge magnitude values of each of the time windows.

7. The method of claim 1, wherein (e) further comprises setting the input parameters to the adjusted input parameter values resulting from (c).

8. The method of claim 1, wherein (d) further comprises recording a frequency value resulting from step (c), and further comprising determining a frequency of the oscillations of the ion during the ion trapping event based on the frequency values of each of the time windows.

9. The method of claim 8, further comprising:

determining a mass-to-charge ratio of the ion based on the determined frequency of the oscillations of the ion during the trapping event, and determining a mass of the ion based on the determined mass-to-charge ratio of the ion and the determined charge of the ion.

10. The method of claim 1, further comprising:

computing a Fast Fourier Transform (FFT) of the ion measurement file, determining a frequency of the oscillations of the ion during the ion trapping event based on the FFT, determining a mass-to-charge ratio of the ion based on the determined frequency of the oscillations of the ion during the trapping event, and determining a mass of the ion based on the determined mass-to-charge ratio of the ion and the determined charge of the ion.

11. A charge detection mass spectrometer (CDMS), comprising:

an electrostatic linear ion trap (ELIT), a source of ions configured to supply ions to the ELIT, a charge sensitive preamplifier having an input operatively coupled to the ELIT, at least one processor operatively coupled to the ELIT and to an output of the preamplifier, and at least one memory having instructions stored therein which, when executed by the at least one processor, cause the at least one processor to (a) control the ELIT to trap therein an ion supplied by the ion source, (b) collect ion measurement information based on output signals produced by the charge sensitive preamplifier as the trapped ion oscillates back and forth through the ELIT, the ion measurement information including charge induced by the ion on a charge detector of the ELIT during each pass of the ion through the ELIT and timing of the induced charges relative to one another, (c) process the ion measurement information in the time-domain for each of a plurality of sequential time windows of the ion measurement information to determine a charge magnitude of the ion during each time window, and (d) determine the magnitude of charge of the trapped ion based on the charge magnitudes of each of the time windows.

12. The CDMS of claim 11, wherein the ELIT comprises a charge detection cylinder positioned between two ion mirrors, wherein during an ion trapping event the ion repeatedly oscillates back and forth between the two ion mirrors each time passing through and inducing a corresponding charge on the charge detection cylinder and in which an ion measurement signal including magnitudes of the induced charges and timing of the induced charges during the trapping event are recorded in an ion measurement file.

13. The CDMS of claim 12, wherein the at least one memory further has instructions stored therein which, when executed by the at least one processor, cause the at least one processor to execute (c) by:

(i) establishing a time window of the ion measurement signal at the beginning of the ion measurement file, (ii) generating a simulated ion measurement signal for the time window of the ion measurement signal using input parameters including estimates of signal frequency, charge magnitude, signal phase and duty cycle, (iii) iteratively processing a variance between the time window of the ion measurement signal and the simulated ion measurement signal by adjusting values of the input parameters until the variance reaches convergence, (iv) recording a charge magnitude value resulting from (iii), (v) advancing the time window of the ion measurement signal by an incremental time amount, (vi) repeating steps (ii)-(iv) until the time window reaches the end of the ion measurement file, and (vi) determining the charge of the ion based on the charge magnitude values of each of the time windows.

14. The CDMS of claim 13, wherein the at least one memory further has instructions stored therein which, when executed by the at least one processor, cause the at least one processor to execute (iv) by recording a frequency value resulting from (iii), and wherein the instructions stored in the at least one memory further include instructions executable by the processor to determine a frequency of the oscillations of the ion during the ion trapping event based on the frequency values of each of the time windows.

15. The CDMS of claim 14, wherein the instructions stored in the at least one memory include instructions executable by the processor to determine a mass-to-charge ratio of the ion based on the determined frequency of the oscillations of the ion during the trapping event, and determine a mass of the ion based on the determined mass-to-charge ratio of the ion and the determined charge of the ion.

16. The CDMS of claim 13, wherein the at least one memory further has instructions stored therein which, when executed by the at least one processor, cause the at least one processor to execute (iii) by:

(1) determining a variance between the time window of the ion measurement signal and the simulated ion measurement signal, (2) executing an optimization process to reduce the variance between the time window of the ion measurement signal and the simulated ion measurement signal, and (3) adjusting values of the input parameters based on a result of the optimization process.

17. The CDMS of claim 16, wherein the at least one memory further has instructions stored therein which, when executed by the at least one processor, cause the at least one processor to execute (iii) by recording the adjusted charge magnitude value upon convergence of the variance, and wherein the at least one memory further has instructions stored therein which, when executed by the at least one processor, cause the at least one processor to execute (vi) by determining the charge magnitude of the ion based on the adjusted charge magnitude values of each of the time windows.

18. The CDMS of claim 13, wherein the at least one memory further has instructions stored therein which, when executed by the at least one processor, cause the at least one processor to execute (v) by setting the input parameters to the adjusted input parameter values resulting from (iii).

19. The CDMS of claim 13, wherein the at least one memory further has instructions stored therein which, when executed by the at least one processor, cause the at least one processor to execute (iv) by recording a frequency value resulting from step (iii), and wherein the instructions stored in the at least one memory further include instructions executable by the processor to determine a frequency of the oscillations of the ion during the ion trapping event based on the frequency values of each of the time windows.

20. The CDMS of claim 12, wherein the instructions stored in the at least one memory further include instructions executable by the processor to compute a Fast Fourier Transform (FFT) of the ion measurement file, and determine a frequency of the oscillations of the ion during the ion trapping event based on the FFT.

* * * * *